(12) United States Patent
Huang et al.

(10) Patent No.: US 8,310,767 B2
(45) Date of Patent: Nov. 13, 2012

(54) IMAGE CAPTURING LENS ASSEMBLY

(75) Inventors: Hsin Hsuan Huang, Taichung (TW); Tsung Han Tsai, Taichung (TW)

(73) Assignee: Largen Precision Co., Ltd., Taichung (TW)

( * ) Notice: Subject to any disclaimer, the term of this patent is extended or adjusted under 35 U.S.C. 154(b) by 97 days.

(21) Appl. No.: 13/084,855

(22) Filed: Apr. 12, 2011

(65) Prior Publication Data
US 2012/0194726 A1    Aug. 2, 2012

(30) Foreign Application Priority Data
Jan. 27, 2011    (TW) .............................. 100103027 A

(51) Int. Cl.
*G02B 9/62* (2006.01)
*G02B 3/02* (2006.01)
(52) U.S. Cl. ...................................... 359/713; 359/757
(58) Field of Classification Search .................. 359/708, 359/713, 754–757, 759
See application file for complete search history.

(56) References Cited

U.S. PATENT DOCUMENTS
7,502,181 B2    3/2009    Shinohara

*Primary Examiner* — Darryl J Collins
(74) *Attorney, Agent, or Firm* — Morris, Manning & Martin, LLP; Tim Tingkang Xia, Esq.

(57) ABSTRACT

This invention provides an image capturing lens assembly, in order from an object side to an image side comprising: a first lens element with positive refractive power having a convex object-side surface; a second lens element; a third lens element; a fourth lens element having at least one of an object-side surface and an image-side surface thereof being aspheric; a fifth lens element with positive refractive power having a convex image-side surface, at least one of an object-side surface and the image-side surface thereof being aspheric, and the fifth lens element is made of plastic; and a sixth lens element with negative refractive power having a concave image-side surface, at least one of an object-side surface and the image-side surface thereof being aspheric, and the sixth lens element is made of plastic. By such arrangement, the photo-sensitivity and the total track length of the image capturing lens assembly can be reduced. Furthermore, the aberration and astigmatism of the assembly can be effectively corrected for obtaining higher image resolution.

24 Claims, 18 Drawing Sheets

IMAGE CAPTURING LENS ASSEMBLY

CROSS-REFERENCE TO RELATED APPLICATION

This non-provisional application claims priority under 35 U.S.C. §119(a) on Patent Application No. 100103027 filed in Taiwan, R.O.C. on Jan. 27, 2011, the entire contents of which are hereby incorporated by reference.

BACKGROUND OF THE INVENTION

1. Field of the Invention

The present invention relates to an image capturing lens assembly, and more particularly, to a compact image capturing lens assembly used in electronic products.

2. Description of the Prior Art

The demand for compact imaging lens assembly has grown in recent years as the popularity of portable electronic products with the photographing function has increased. The sensor of a general photographing camera is none other than CCD (Charge Coupled Device) or CMOS (Complementary Metal Oxide Semiconductor Sensor). Furthermore, as advanced semiconductor manufacturing technology has allowed the pixel size of sensors to be reduced, and the current electronic products are leaning toward a trend of being more compact, there is an increasing demand for compact imaging lens assembly featuring better image quality.

A conventional compact imaging lens system with high image quality equipped on a portable electronic product is often composed of five lens elements such as the lens system set forth in U.S. Pat. No. 7,502,181. However, with the popularity of high level portable electronic products, such as smart phone and PDA (Personal Digital Assistant), the demand for the pixel size and image quality of compact imaging lens system increase fast, and the conventional lens system with five lens elements can no longer satisfy the imaging lens systems of even higher level. Even more, the current electronic products are leaning toward a trend of being more compact and having high performance; therefore, a need exists in the art for an image capturing lens assembly that features better image quality and is compact while maintaining a moderate total track length.

SUMMARY OF THE INVENTION

The present invention provides an image capturing lens assembly comprising, in order from an object side to an image side: a first lens element with positive refractive power having a convex object-side surface; a second lens element; a third lens element; a fourth lens element having at least one of an object-side surface and an image-side surface thereof being aspheric; a fifth lens element with positive refractive power having a convex image-side surface, at least one of an object-side surface and the image-side surface thereof being aspheric, and the fifth lens element is made of plastic; and a sixth lens element with negative refractive power having a concave image-side surface, at least one of an object-side surface and the image-side surface thereof being aspheric, and the sixth lens element is made of plastic; wherein a radius of curvature of the image-side surface of the fifth lens element is R10, a radius of curvature of the object-side surface of the sixth lens element is R11, the image capturing lens assembly further comprises an image sensor on an image plane; a distance on the optical axis between the object-side surface of the first lens element and the image plane is TTL, half of a diagonal length of an effective photosensitive area of the image sensor is ImgH, and they satisfy the following relations: $|R10/R11|<0.75$; and $TTL/ImgH<3.0$.

On the other hand, the present invention provides an image capturing lens assembly comprising, in order from an object side to an image side: a first lens element with positive refractive power having a convex object-side surface; a second lens element with negative refractive power; a third lens element; a fourth lens element having at least one of an object-side surface and an image-side surface thereof being aspheric; a fifth lens element with positive refractive power having a convex image-side surface, and at least one of an object-side surface and the image-side surface thereof being aspheric; and a sixth lens element with negative refractive power having a concave image-side surface, and at least one inflection point is formed on at least one of an object-side surface and the image-side surface thereof; wherein a focal length of the fifth lens element is f5, a focal length of the sixth lens element is f6, a focal length of the third lens element is f3, a focal length of the fourth lens element is f4, and they satisfy the following relation: $(|f5|+|f6|)/(|f3|+|f4|)<0.4$.

By such arrangement, the photo-sensitivity and the total track length of the image capturing lens assembly can be reduced. Furthermore, the aberration and astigmatism of the assembly can be effectively corrected for obtaining high image resolution.

In the aforementioned image capturing lens assembly, the first lens element has positive refractive power, and thereby the sensitivity of the assembly can be reduced. The second lens element has negative refractive power, and thereby the aberration of the assembly can be favorably corrected. The fifth lens element has positive refractive power and thereby can provide the main refractive power for reducing the total track length favorably. The sixth lens element has negative refractive power, and thereby the aberration of the assembly can be favorably corrected.

In the aforementioned image capturing lens assembly, when the first lens element has a convex object-side surface, the total track length can be reduced favorably. When the second lens element has a concave image-side surface, the astigmatism of the assembly can be favorably corrected. When the fifth lens element has a convex object-side surface, the total track length can be reduced favorably. When the sixth lens element has a concave object-side surface and makes the sixth lens element as a concave-concave lens element, the aberration of the assembly can be favorably corrected. When the sixth lens element has a concave image-side surface, the principal point of the assembly can be positioned away from the image plane so that reducing the total track length of the assembly.

DETAILED DESCRIPTION OF THE PREFERRED EMBODIMENTS

Figure 1A:
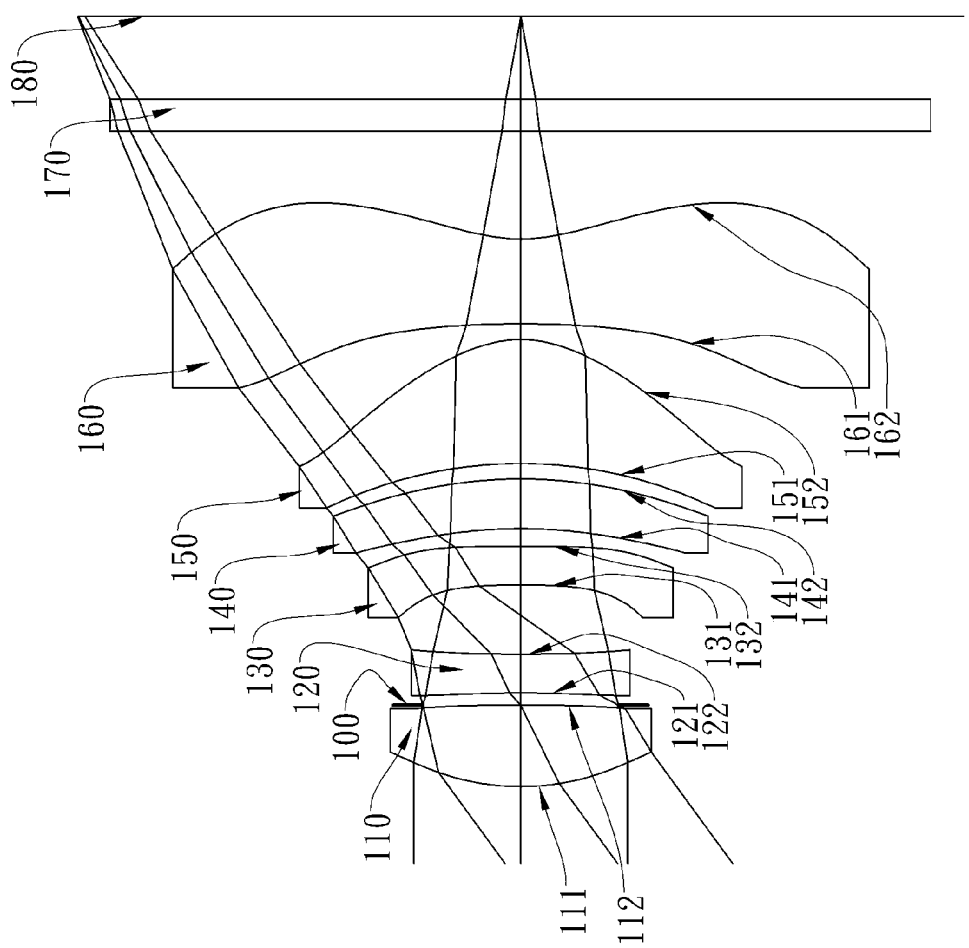
FIG. 1A shows an image capturing lens assembly in accordance with a first embodiment of the present invention.

The present invention provides an image capturing lens assembly comprising, in order from an object side to an image side: a first lens element with positive refractive power having a convex object-side surface; a second lens element; a third lens element; a fourth lens element having at least one of an object-side surface and an image-side surface thereof being aspheric; a fifth lens element with positive refractive power having a convex image-side surface, at least one of an object-side surface and the image-side surface thereof being aspheric, and the fifth lens element is made of plastic; and a sixth lens element with negative refractive power having a concave image-side surface, at least one of an object-side surface and the image-side surface thereof being aspheric, and the sixth lens element is made of plastic; wherein a radius of curvature of the image-side surface of the fifth lens element is R10, a radius of curvature of the object-side surface of the sixth lens element is R11, the image capturing lens assembly further comprises an image sensor on an image plane; a distance on the optical axis between the object-side surface of the first lens element and the image plane is TTL, half of a diagonal length of an effective photosensitive area of the image sensor is ImgH, and they satisfy the following relations: |R10/R11|<0.75; and TTL/ImgH<3.0.

When the relation of |R10/R11|<0.75 is satisfied, the curvature of the convex image-side surface of the fifth lens element can effectively reduce the total track length of the assembly; preferably, the following relation is satisfied: |R10/R11|<0.40.

When the relation of TTL/ImgH<3.0 is satisfied, it is favorable for keeping the image capturing lens assembly compact so that it is suitable to be installed in compact electronic products.

In the aforementioned image capturing lens assembly, a focal length of the image capturing lens assembly is f, a focal length of the third lens element is f3, a focal length of the fourth lens element is f4, and they preferably satisfy the following relation: |f/f3|+|f/f4|<1.3. When the above relation is satisfied, the refractive power of the third lens element and the fourth lens element is not excessively large, and thereby the production of the aberration of the assembly can be reduced; more preferably, the following relation is satisfied: |f/f3|+|f/f4|<0.9.

In the aforementioned image capturing lens assembly, preferably, at least one inflection point is formed on at least one of the object-side and image-side surfaces of the fifth lens element, and thereby the angle at which light projects onto the sensor from the off-axis field can be effectively reduced, and the off-axis aberrations can be further corrected.

In the aforementioned image capturing lens assembly, preferably, while SL/TTL is close to 0.7, it is favorable for the property of wild view of field and is good for the correction of distortion and chromatic aberration of magnification. Furthermore, the arrangement can effectively reduce the sensitivity of the assembly. While SL/TTL is close to 1.1, the total track length can be effectively reduced. In addition, the aforementioned arrangement can position the exit pupil of the image capturing lens assembly away from the image plane, and thereby light will be projected onto the electronic sensor at a nearly perpendicular angle, and this is the telecentric feature of the image side. The telecentric feature is very important to the photosensitive ability of the solid-state sensor as it can improve the photosensitivity of the sensor to reduce the occurrence of shading.

In the aforementioned image capturing lens assembly, a radius of curvature of the object-side surface of the first lens element is R1, a radius of curvature of the image-side surface of the first lens element is R2, and they preferably satisfy the following relation: |R1/R2|<0.3. When the above relation is satisfied, the spherical aberration can be favorably corrected.

In the aforementioned image capturing lens assembly, a radius of curvature of the image-side surface of the fifth lens element is R10, a thickness of the fifth lens element on the optical axis is CT5, and they preferably satisfy the following relation: −1.5<R10/CT5<−0.5. When the above relation is satisfied, the total track length can be effectively reduced by the refractive power provided by the fifth lens element.

In the aforementioned image capturing lens assembly, an Abbe number of the first lens element is V1, an Abbe number of the second lens element is V2, and they preferably satisfy the following relation: 28<V1−V2<45. When the above relation is satisfied, the chromatic aberration of the assembly can be favorably corrected.

In the aforementioned image capturing lens assembly, a focal length of the fifth lens element is f5, a focal length of the sixth lens element is f6, a focal length of the third lens element is f3, a focal length of the fourth lens element is f4, and they preferably satisfy the following relation: (|f5|+|f6|)/(|f3|+|f4|)<0.3. When the above relation is satisfied, the refractive power of the third and the fourth lens elements can cooperate with the refractive power of the fifth and the sixth lens elements for correcting the aberration of the assembly effectively.

In the aforementioned image capturing lens assembly, an Abbe number of the first lens element is V1, an Abbe number of the second lens element is V2, an Abbe number of the third lens element is V3, and they preferably satisfy the following relation: 23<V1−(V2+V3)/2<45. When the above relation is satisfied, the chromatic aberration of the assembly can be effectively corrected by the second and the third lens elements.

In the aforementioned image capturing lens assembly, a focal length of the image capturing lens assembly is f, a focal length of the fifth lens element is f5, a focal length of the sixth lens element is f6, and they preferably satisfy the following relation: 3.0<|f/f5|+|f/f6|<6.0. When the above relation is satisfied, the total track length can be effectively reduced by the refractive power of the fifth and the sixth lens elements so as to meet the object of being compact.

In the aforementioned image capturing lens assembly, a thickness of the second lens element on the optical axis is CT2, a thickness of the third lens element on the optical axis is CT3, a thickness of the fourth lens element on the optical axis is CT4, a focal length of the image capturing lens assembly is f, and they preferably satisfy the following relation: $0.10<(CT2+CT3+CT4)/f<0.35$. When the above relation is satisfied, the total thickness of the second, the third and the fourth lens elements is not excessively large so that the volume of the assembly can be favorably reduced; more preferably, the following relation is satisfied: $0.10<(CT2+CT3+CT4)/f<0.28$.

On the other hand, the present invention provides an image capturing lens assembly comprising, in order from an object side to an image side: a first lens element with positive refractive power having a convex object-side surface; a second lens element with negative refractive power; a third lens element; a fourth lens element having at least one of an object-side surface and an image-side surface thereof being aspheric; a fifth lens element with positive refractive power having a convex image-side surface, and at least one of an object-side surface and the image-side surface thereof being aspheric; and a sixth lens element with negative refractive power having a concave image-side surface, and at least one inflection point is formed on at least one of an object-side surface and the image-side surface thereof; wherein a focal length of the fifth lens element is f5, a focal length of the sixth lens element is f6, a focal length of the third lens element is f3, a focal length of the fourth lens element is f4, and they satisfy the following relation: $(|f5|+|f6|)/(|f3|+|f4|)<0.4$.

When the relation of $(|f5|+|f6|)/(|f3|+|f4|)<0.4$ is satisfied, the refractive power of the third and the fourth lens elements can cooperate with the refractive power of the fifth and the sixth lens elements for correcting the aberration of the assembly effectively; preferably, the following relation is satisfied: $(|f5|+|f6|)/(|f3|+|f4|)<0.15$.

In the aforementioned image capturing lens assembly, preferably, while SL/TTL is close to 0.7, it is favorable for the property of wild view of field and is good for the correction of distortion and chromatic aberration of magnification. Furthermore, the arrangement can effectively reduce the sensitivity of the assembly. While SL/TTL is close to 1.1, the total track length can be effectively reduced. In addition, the aforementioned arrangement can position the exit pupil of the image capturing lens assembly away from the image plane, and thereby light will be projected onto the electronic sensor at a nearly perpendicular angle, and this is the telecentric feature of the image side. The telecentric feature is very important to the photosensitive ability of the solid-state sensor as it can improve the photosensitivity of the sensor to reduce the occurrence of shading.

In the aforementioned image capturing lens assembly, a thickness of the second lens element on the optical axis is CT2, a thickness of the third lens element on the optical axis is CT3, a thickness of the fourth lens element on the optical axis is CT4, a focal length of the image capturing lens assembly is f, and they preferably satisfy the following relation: $0.10<(CT2+CT3+CT4)/f<0.28$. When the above relation is satisfied, the total thickness of the second, the third and the fourth lens elements is not excessively large so that the volume of the assembly can be favorably reduced.

In the aforementioned image capturing lens assembly, an Abbe number of the first lens element is V1, an Abbe number of the second lens element is V2, and they preferably satisfy the following relation: $28<V1-V2<45$. When the above relation is satisfied, the chromatic aberration of the assembly can be favorably corrected.

In the aforementioned image capturing lens assembly, an Abbe number of the first lens element is V1, an Abbe number of the second lens element is V2, an Abbe number of the third lens element is V3, and they preferably satisfy the following relation: $23<V1-(V2+V3)/2<45$. When the above relation is satisfied, the chromatic aberration of the assembly can be effectively corrected by the second and the third lens elements.

In the aforementioned image capturing lens assembly, an image sensor is further provided on an image plane; a distance on the optical axis between the object-side surface of the first lens element and the image plane is TTL, half of a diagonal length of an effective photosensitive area of the image sensor is ImgH, and they preferably satisfy the following relation: $TTL/ImgH<2.3$. When the above relation is satisfied, it is favorable for keeping the image capturing lens assembly compact so that it is suitable to be installed in compact electronic products.

In the aforementioned image capturing lens assembly, the lens elements can be made of glass or plastic material. If the lens elements are made of glass, the freedom for distributing the refractive power of the image capturing lens assembly can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements used in an optical system. Consequently, the total track length of the image capturing lens assembly can be effectively reduced.

In the present image capturing lens assembly, if a lens element is described to have a convex surface, it means the portion of the surface in proximity to the optical axis is convex; if a lens element is described to have a concave surface, it means the portion of the surface in proximity to the optical axis is concave.

In the present image capturing lens assembly, there can be at least one aperture stop provided, such as a glare stop or a field stop, for eliminating stray light and thereby promoting image resolution thereof.

Preferred embodiments of the present invention will be described in the following paragraphs by referring to the accompanying drawings.

Embodiment 1

Figure 1B:
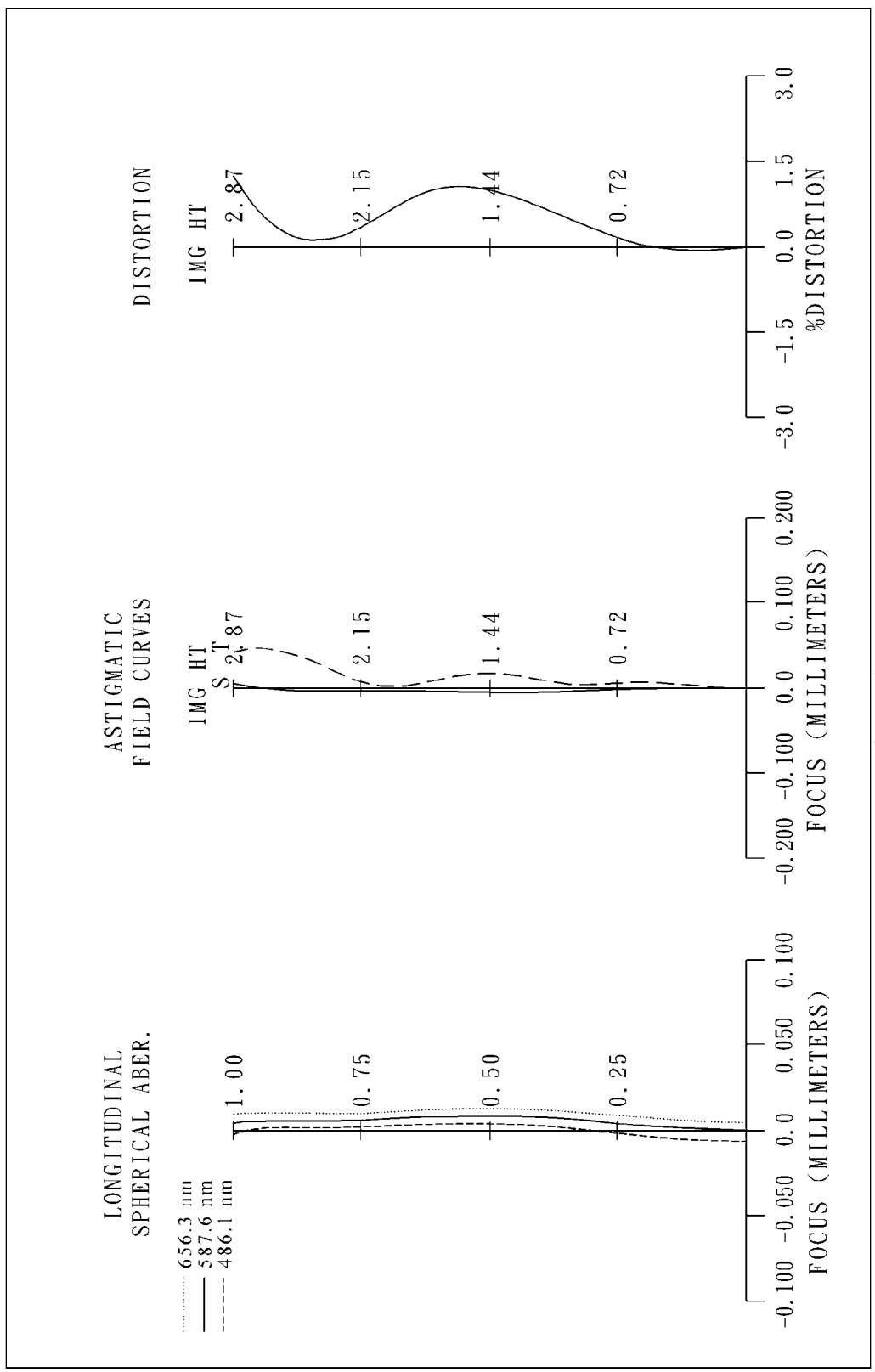
FIG. 1B shows the aberration curves of the first embodiment of the present invention.

FIG. 1A shows an image capturing lens assembly in accordance with the first embodiment of the present invention, and FIG. 1B shows the aberration curves of the first embodiment of the present invention. The image capturing lens assembly of the first embodiment of the present invention mainly comprises six lens elements, in order from an object side to an image side:

a plastic first lens element 110 with positive refractive power having a convex object-side surface 111 and a convex image-side surface 112, the object-side and image-side surfaces 111 and 112 thereof being aspheric;

a plastic second lens element 120 with negative refractive power having a concave object-side surface 121 and a concave image-side surface 122, the object-side and image-side surfaces 121 and 122 thereof being aspheric;

a plastic third lens element 130 with negative refractive power having a concave object-side surface 131 and a concave image-side surface 132, the object-side and image-side surfaces 131 and 132 thereof being aspheric;

a plastic fourth lens element 140 with positive refractive power having a concave object-side surface 141 and a convex image-side surface 142, the object-side and image-side surfaces 141 and 142 thereof being aspheric;

a plastic fifth lens element 150 with positive refractive power having a concave object-side surface 151 and a convex image-side surface 152, the object-side and image-side surfaces 151 and 152 thereof being aspheric, and at least one inflection point is formed on the image-side surface 152 thereof; and a plastic sixth lens element 160 with negative refractive power having a concave object-side surface 161 and a concave image-side surface 162, the object-side and image-side surfaces 161 and 162 thereof being aspheric, and at least one inflection point is formed on the image-side surface 162 thereof;

wherein an aperture stop 100 is disposed between the first lens element 110 and the second lens element 120;

the image capturing lens assembly further comprises an IR filter 170 disposed between the image-side surface 162 of the sixth lens element 160 and an image plane 180, and the IR filter 170 is made of glass and has no influence on the focal length of the image capturing lens assembly; the image capturing lens assembly further comprises an image sensor provided on the image plane 180.

The detailed optical data of the first embodiment is shown TABLE 1, and the aspheric surface data is shown in TABLE 2, wherein the units of the radius of curvature, the thickness and the focal length are expressed in mm, and HFOV is half of the maximal field of view.

TABLE 1

(Embodiment 1)
f = 3.90 mm, Fno = 2.80, HFOV = 36.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.569510 (ASP) | 0.531 | Plastic | 1.544 | 55.9 | 2.64 |
| 2 | | −14.798900 (ASP) | −0.001 | | | | |
| 3 | Ape. Stop | Plano | 0.079 | | | | |
| 4 | Lens 2 | −8.250700 (ASP) | 0.252 | Plastic | 1.634 | 23.8 | −6.82 |
| 5 | | 9.195600 (ASP) | 0.451 | | | | |
| 6 | Lens 3 | −7.194000 (ASP) | 0.250 | Plastic | 1.634 | 23.8 | −9.48 |
| 7 | | 36.964500 (ASP) | 0.118 | | | | |
| 8 | Lens 4 | −3.053300 (ASP) | 0.323 | Plastic | 1.544 | 55.9 | 97.78 |
| 9 | | −2.995240 (ASP) | 0.100 | | | | |
| 10 | Lens 5 | −2.947600 (ASP) | 0.808 | Plastic | 1.544 | 55.9 | 1.62 |
| 11 | | −0.743310 (ASP) | 0.102 | | | | |
| 12 | Lens 6 | −6.328700 (ASP) | 0.552 | Plastic | 1.535 | 56.3 | −1.59 |
| 13 | | 1.012740 (ASP) | 0.700 | | | | |
| 14 | IR-filter | Plano | 0.210 | Glass | 1.517 | 64.2 | — |
| 15 | | Plano | 0.539 | | | | |
| 16 | Image | Plano | — | | | | |

Note:
Reference Wavelength is 587.6 nm (d-line)

TABLE 2

Aspheric Coefficients

| Surface # | 1 | 2 | 4 | 5 | 6 | 7 |
|---|---|---|---|---|---|---|
| k = | −7.25388E+00 | 1.00379E+01 | 4.10838E+00 | −1.00000E+02 | −1.00000E+00 | 1.69023E+01 |
| A4 = | 2.22876E−01 | −2.80306E−02 | 2.14826E−02 | 9.71100E−03 | −3.33382E−01 | −1.79614E−01 |
| A6 = | −2.18793E−01 | 2.13800E−02 | 2.39260E−02 | 2.63865E−03 | −2.28386E−01 | −8.27328E−02 |
| A8 = | 1.77170E−01 | −2.32063E−01 | 2.32111E−01 | 1.33729E−01 | 2.90200E−01 | 1.38007E−01 |
| A10 = | −1.56149E−01 | 4.93699E−01 | −8.19442E−01 | −3.74732E−01 | −4.58529E−01 | −5.09041E−02 |
| A12 = | 2.93980E−02 | −5.65306E−01 | 1.42245E+00 | 4.58355E−01 | 3.49471E−01 | 2.27092E−02 |
| A14 = | −2.07519E−02 | 3.20589E−01 | −6.99006E−01 | −1.14126E−01 | | |

| Surface # | 8 | 9 | 10 | 11 | 12 | 13 |
|---|---|---|---|---|---|---|
| k = | 5.27736E+00 | −3.89183E−01 | 3.37791E−01 | −3.33275E+00 | −9.13443E+01 | −8.31687E+00 |
| A4 = | 5.06869E−02 | 2.34692E−03 | −1.63988E−03 | −1.70905E−01 | −2.49446E−02 | −6.28862E−02 |
| A6 = | 7.91172E−02 | 1.71434E−03 | −7.98558E−04 | 1.62961E−01 | −2.71157E−02 | 1.94811E−02 |
| A8 = | −2.18315E−01 | 2.87826E−05 | 5.45696E−04 | −1.35624E−01 | 1.23984E−02 | −7.30192E−03 |
| A10 = | 2.92150E−01 | 8.30047E−05 | 4.73182E−04 | 7.00447E−02 | −9.71335E−04 | 1.68238E−03 |
| A12 = | −1.71641E−01 | | | −1.43196E−02 | −1.60987E−04 | −2.14675E−04 |
| A14 = | 3.72514E−02 | | | 5.60388E−04 | 1.95180E−05 | 1.18682E−05 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present image capturing lens assembly, the focal length of the image capturing lens assembly is f, and it satisfies the relation: f=3.90 (mm).

In the first embodiment of the present image capturing lens assembly, the f-number of the image capturing lens assembly is Fno, and it satisfies the relation: Fno=2.80.

In the first embodiment of the present image capturing lens assembly, half of the maximal field of view of the image capturing lens assembly is HFOV, and it satisfies the relation: HFOV=36.0 deg.

In the first embodiment of the present image capturing lens assembly, an Abbe number of the first lens element 110 is V1, an Abbe number of the second lens element 120 is V2, and they satisfy the relation: V1−V2=32.1.

In the first embodiment of the present image capturing lens assembly, the Abbe number of the first lens element 110 is V1, the Abbe number of the second lens element 120 is V2, an Abbe number of the third lens element 130 is V3, and they satisfy the relation: V1−(V2+V3)/2=32.1.

In the first embodiment of the present image capturing lens assembly, the radius of curvature of the object-side surface 111 of the first lens element 110 is R1, the radius of curvature of the image-side surface 112 of the first lens element 110 is R2, and they satisfy the relation: |R1/R2|=0.11.

In the first embodiment of the present image capturing lens assembly, the radius of curvature of the image-side surface 152 of the fifth lens element 150 is R10, the radius of curvature of the object-side surface 161 of the sixth lens element 160 is R11, and they satisfy the relation: |R10/R11|=0.12.

In the first embodiment of the present image capturing lens assembly, the radius of curvature of the image-side surface 152 of the fifth lens element 150 is R10, a thickness of the fifth lens element 150 on the optical axis is CT5, and they satisfy the relation: R10/CT5=−0.92.

In the first embodiment of the present image capturing lens assembly, a focal length of the image capturing lens assembly is f, a focal length of the third lens element 130 is f3, a focal length of the fourth element 140 is f4, and they satisfy the relation: |f/f3|+|f/f4|=0.45.

In the first embodiment of the present image capturing lens assembly, the focal length of the image capturing lens assembly is f, a focal length of the fifth lens element 150 is f5, a focal length of the sixth element 160 is f6, and they satisfy the relation: |f/f5|+|f/f6|=4.86.

In the first embodiment of the present image capturing lens assembly, the focal length of the fifth lens element 150 is f5, the focal length of the sixth element 160 is f6, the focal length of the third lens element 130 is f3, the focal length of the fourth element 140 is f4, and they satisfy the relation: (|f5|+|f6|)/(|f3|+|f4|)=0.03.

In the first embodiment of the present image capturing lens assembly, a thickness of the second lens element 120 on the optical axis is CT2, a thickness of the third lens element 130 on the optical axis is CT3, a thickness of the fourth lens element 140 on the optical axis is CT4, the focal length of the image capturing lens assembly is f, and they satisfy the relation: (CT2+CT3+CT4)/f=0.21.

In the first embodiment of the present image capturing lens assembly, the distance on the optical axis between the aperture stop 100 and the image plane 180 is SL, the distance on the optical axis between the object-side surface 111 of the first lens element 110 and the image plane 180 is TTL, and they satisfy the relation: SL/TTL=0.89.

In the first embodiment of the present image capturing lens assembly, the distance on the optical axis between the object-side surface 111 of the first lens element 110 and the image plane 180 is TTL, half of the diagonal length of the effective photosensitive area of the image sensor is ImgH, and they preferably satisfy the relation: TTL/ImgH=1.72.

Embodiment 2

Figure 2A:
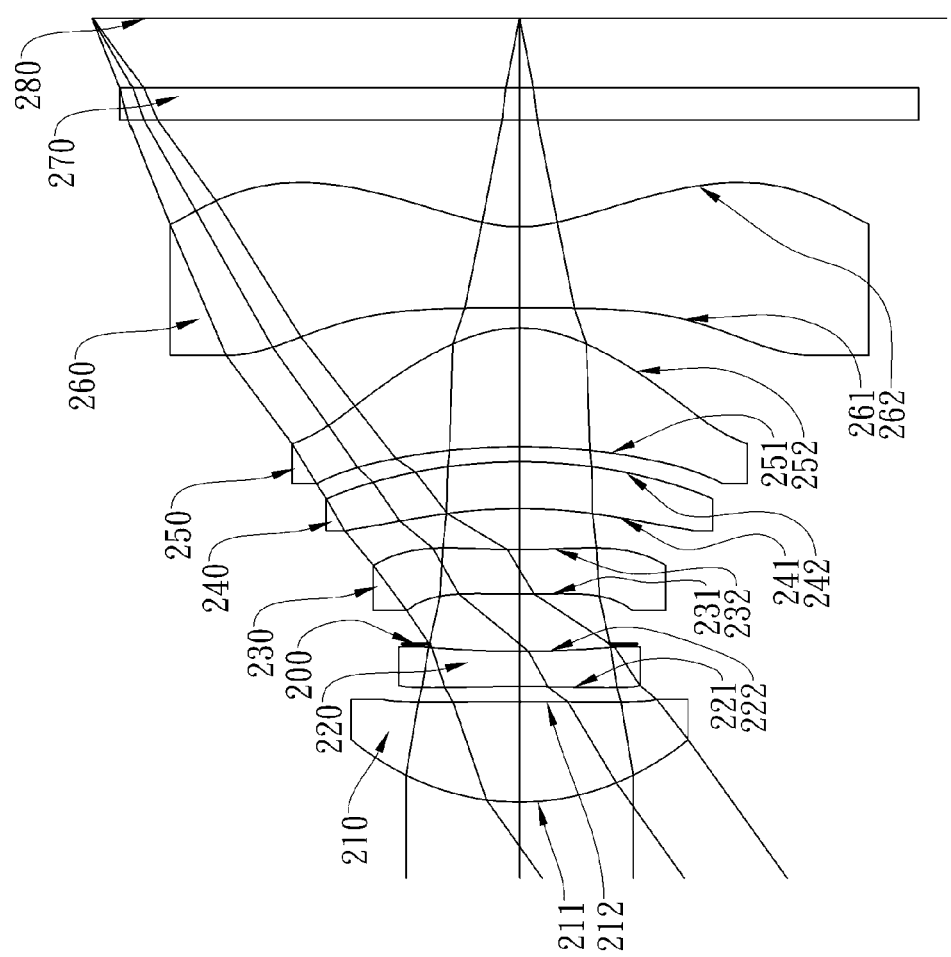
FIG. 2A shows an image capturing lens assembly in accordance with a second embodiment of the present invention.
Figure 2B:
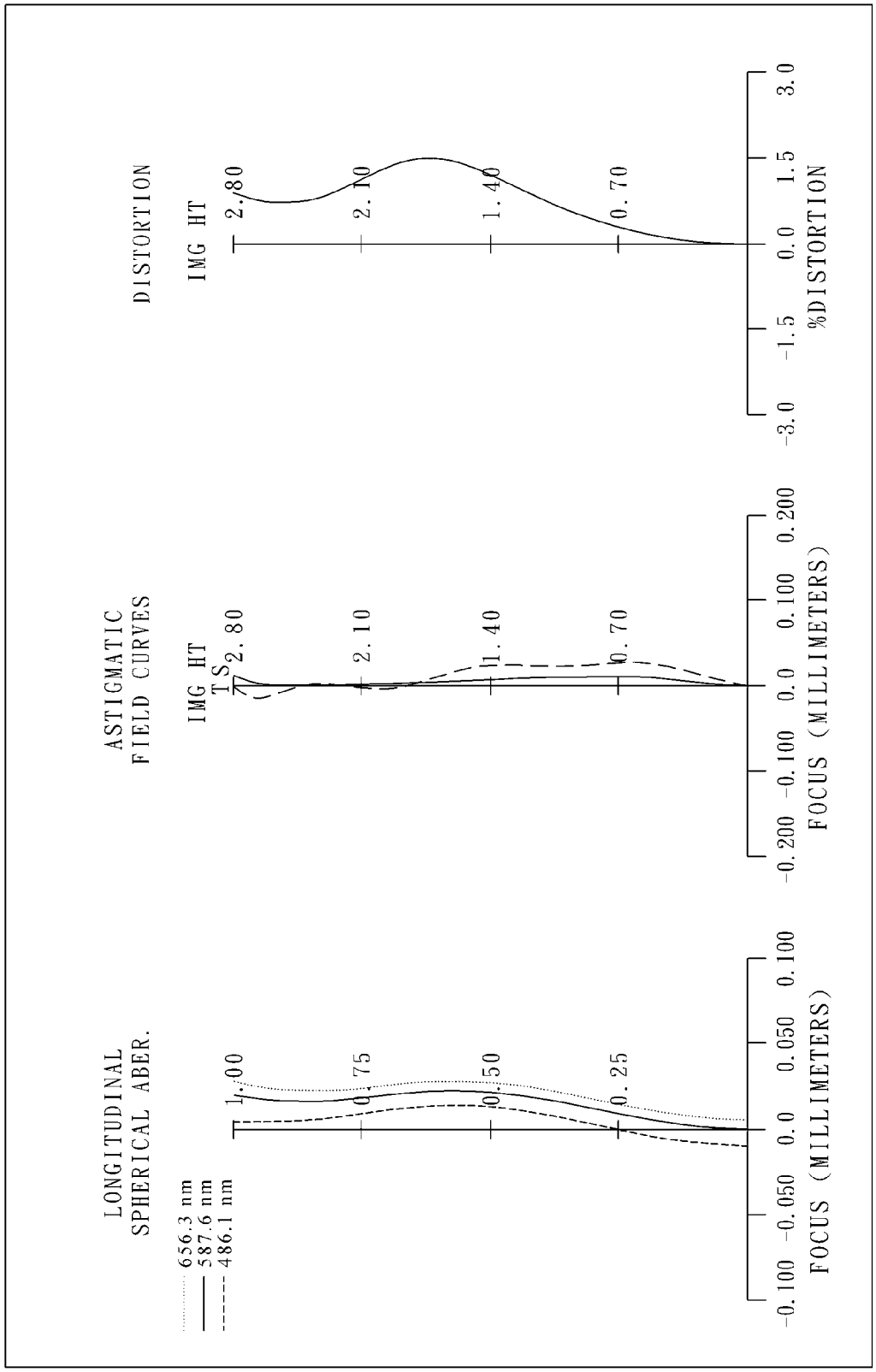
FIG. 2B shows the aberration curves of the second embodiment of the present invention.

FIG. 2A shows an image capturing lens assembly in accordance with the second embodiment of the present invention, and FIG. 2B shows the aberration curves of the second embodiment of the present invention. The image capturing lens assembly of the second embodiment of the present invention mainly comprises six lens elements, in order from an object side to an image side:

a plastic first lens element 210 with positive refractive power having a convex object-side surface 211 and a convex image-side surface 212, the object-side and image-side surfaces 211 and 212 thereof being aspheric;

a plastic second lens element 220 with negative refractive power having a concave object-side surface 221 and a concave image-side surface 222, the object-side and image-side surfaces 221 and 222 thereof being aspheric;

a plastic third lens element 230 with negative refractive power having a convex object-side surface 231 and a concave image-side surface 232, the object-side and image-side surfaces 231 and 232 thereof being aspheric;

a plastic fourth lens element 240 with negative refractive power having a concave object-side surface 241 and a convex image-side surface 242, the object-side and image-side surfaces 241 and 242 thereof being aspheric;

a plastic fifth lens element 250 with positive refractive power having a concave object-side surface 251 and a convex image-side surface 252, the object-side and image-side surfaces 251 and 252 thereof being aspheric, and at least one inflection point is formed on the image-side surface 252 thereof; and a plastic sixth lens element 260 with negative refractive power having a concave object-side surface 261 and a concave image-side surface 262, the object-side and image-side surfaces 261 and 262 thereof being aspheric, and at least one inflection point is formed on the image-side surface 262 thereof;

wherein an aperture stop 200 is disposed between the second lens element 220 and the third lens element 230;

the image capturing lens assembly further comprises an IR filter 270 disposed between the image-side surface 262 of the sixth lens element 260 and an image plane 280, and the IR filter 270 is made of glass and has no influence on the focal length of the image capturing lens assembly; the image capturing lens assembly further comprises an image sensor provided on the image plane 280.

The detailed optical data of the second embodiment is shown in TABLE 3, and the aspheric surface data is shown in TABLE 4, wherein the units of the radius of curvature, the thickness and the focal length are expressed in mm, and HFOV is half of the maximal field of view.

TABLE 3

(Embodiment 2)
f = 3.88 mm, Fno = 2.60, HFOV = 35.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.644060 (ASP) | 0.659 | Plastic | 1.535 | 56.3 | 2.97 |
| 2 | | −38.766200 (ASP) | 0.100 | | | | |
| 3 | Lens 2 | −11.343000 (ASP) | 0.230 | Plastic | 1.634 | 23.8 | −5.94 |
| 4 | | 5.678100 (ASP) | 0.050 | | | | |
| 5 | Ape. Stop | Plano | 0.327 | | | | |
| 6 | Lens 3 | 8.871400 (ASP) | 0.292 | Plastic | 1.634 | 23.8 | −19.19 |
| 7 | | 5.064900 (ASP) | 0.270 | | | | |
| 8 | Lens 4 | −3.325500 (ASP) | 0.307 | Plastic | 1.544 | 55.9 | −176.28 |
| 9 | | −3.557000 (ASP) | 0.100 | | | | |
| 10 | Lens 5 | −4.301300 (ASP) | 0.781 | Plastic | 1.544 | 55.9 | 1.70 |
| 11 | | −0.810190 (ASP) | 0.132 | | | | |
| 12 | Lens 6 | −24.332500 (ASP) | 0.533 | Plastic | 1.535 | 56.3 | −1.71 |
| 13 | | 0.958540 (ASP) | 0.700 | | | | |
| 14 | IR-filter | Plano | 0.210 | Glass | 1.517 | 64.2 | — |
| 15 | | Plano | 0.459 | | | | |
| 16 | Image | Plano | — | | | | |

Note:
Reference Wavelength is 587.6 nm (d-line)

TABLE 4

Aspheric Coefficients

| Surface # | 1 | 2 | 3 | 4 | 6 | 7 |
|---|---|---|---|---|---|---|
| k = | −7.91340E+00 | −5.00000E+01 | −5.00000E+01 | −1.00000E+02 | −1.00000E+00 | −8.71156E+00 |
| A4 = | 2.16294E−01 | 9.95095E−03 | 2.45335E−02 | 1.86404E−02 | −3.36604E−01 | −1.89369E−01 |
| A6 = | −1.96311E−01 | 3.69091E−02 | 5.56061E−02 | −3.78016E−02 | −2.10146E−01 | −9.97781E−02 |
| A8 = | 1.93126E−01 | −1.53549E−01 | 2.39025E−01 | 2.37267E−01 | 2.94428E−01 | 1.08433E−01 |
| A10 = | −1.36440E−01 | 4.28597E−01 | −9.01576E−01 | −6.38007E−01 | −7.94788E−01 | −5.57527E−02 |
| A12 = | 3.40360E−02 | −5.54608E−01 | 1.42073E+00 | 5.69279E−01 | 3.33496E−01 | 1.33222E−02 |
| A14 = | 7.14928E−03 | 3.27899E−01 | −7.32244E−01 | −1.14128E−01 | | |

| Surface # | 8 | 9 | 10 | 11 | 12 | 13 |
|---|---|---|---|---|---|---|
| k = | 6.17522E+00 | 5.56380E−01 | −3.19300E−01 | −3.69001E+00 | −8.86139E+01 | −6.83134E+00 |
| A4 = | 4.60540E−02 | −3.00820E−04 | 2.24793E−03 | −1.53626E−01 | −2.29225E−02 | −5.91527E−02 |
| A6 = | 7.81522E−02 | 2.62634E−03 | −5.22295E−04 | 1.60835E−01 | −2.66607E−02 | 1.98238E−02 |
| A8 = | −2.15493E−01 | −2.72349E−04 | −2.22437E−03 | −1.36675E−01 | 1.24022E−02 | −7.37230E−03 |
| A10 = | 2.95110E−01 | −1.36205E−03 | −9.06927E−04 | 7.00082E−02 | −9.83888E−04 | 1.68828E−03 |
| A12 = | −1.71973E−01 | | | −1.42668E−02 | −1.60396E−04 | −2.12928E−04 |
| A14 = | 3.76623E−02 | | | 5.46118E−04 | 1.97768E−05 | 1.18558E−05 |

The equation of the aspheric surface profiles of the second embodiment has the same form as that of the first embodiment. Moreover, the definitions of the parameters of the relations are the same as those set forth in the first embodiment, but the value of the relations of the second embodiment are listed in the following table 5:

TABLE 5

(Embodiment 2)

| f | 3.88 | R10/CT5 | −1.04 |
|---|---|---|---|
| Fno | 2.60 | |f/f3| + |f/f4| | 0.22 |
| HFOV | 35.5 | |f/f5| + |f/f6| | 4.55 |
| V1 − V2 | 32.5 | (|f5| + |f6|)/(|f3| + |f4|) | 0.02 |

TABLE 5-continued (Embodiment 2)

| V1 − (V2 + V3)/2 | 32.5 | (CT2 + CT3 + CT4)/f | 0.21 |
|---|---|---|---|
| |R1/R2| | 0.04 | SL/TTL | 0.80 |
| |R10/R11| | 0.03 | TTL/ImgH | 1.81 |

Embodiment 3

Figure 3A:
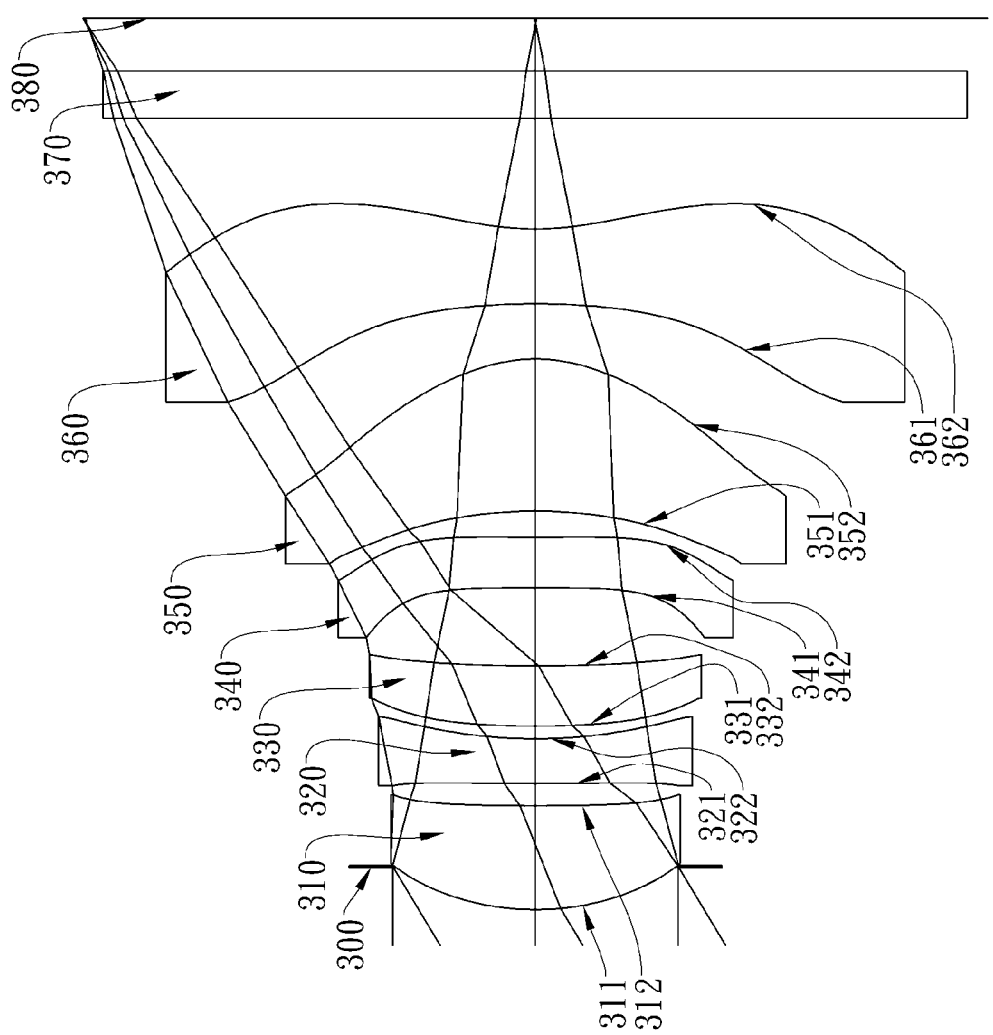
FIG. 3A shows an image capturing lens assembly in accordance with a third embodiment of the present invention.
Figure 3B:
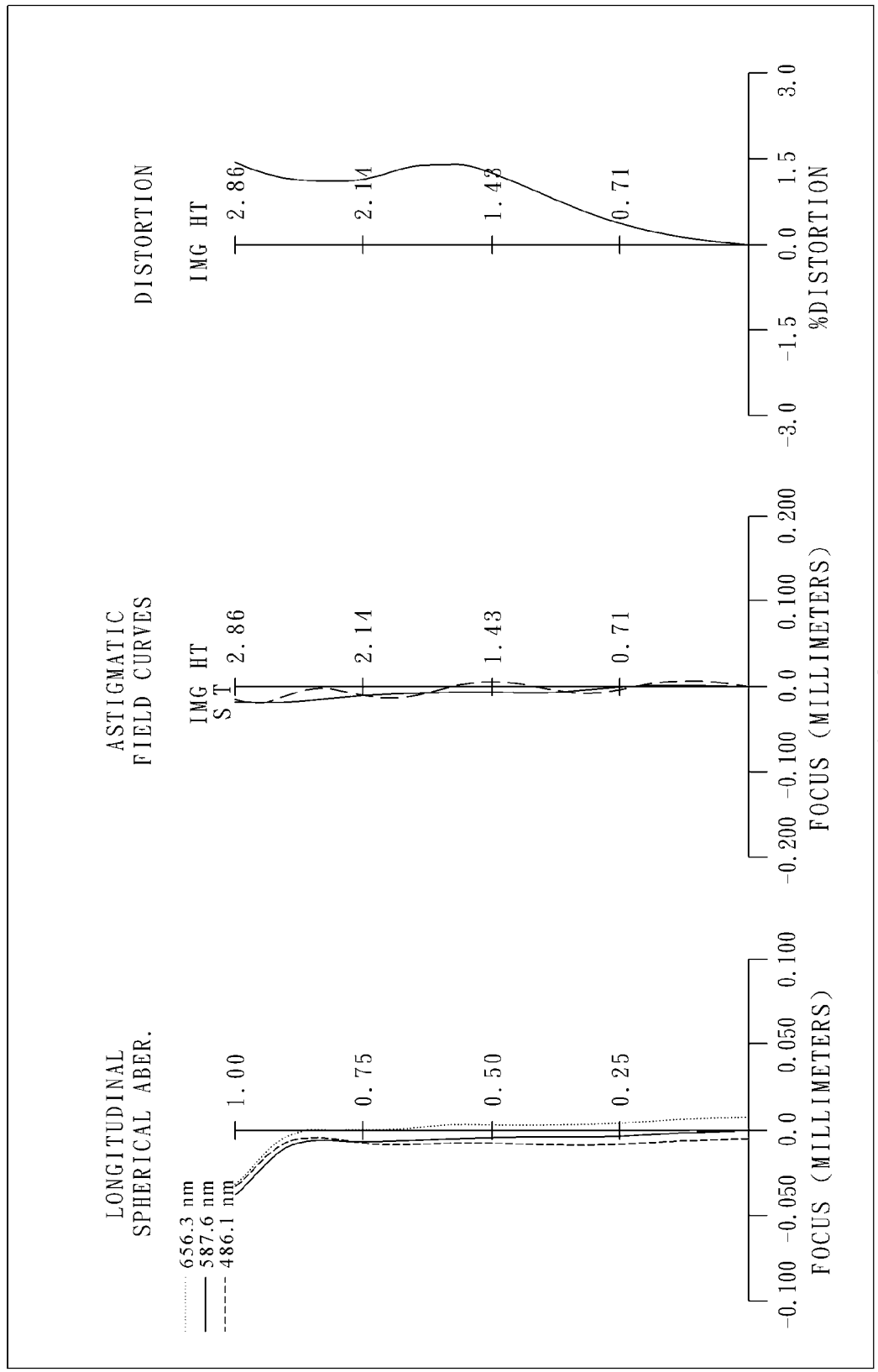
FIG. 3B shows the aberration curves of the third embodiment of the present invention.

FIG. 3A shows an image capturing lens assembly in accordance with the third embodiment of the present invention, and FIG. 3B shows the aberration curves of the third embodiment of the present invention. The image capturing lens assembly of the third embodiment of the present invention mainly comprises six lens elements, in order from an object side to an image side:

a plastic first lens element 310 with positive refractive power having a convex object-side surface 311 and a concave image-side surface 312, the object-side and image-side surfaces 311 and 312 thereof being aspheric;

a plastic second lens element 320 with negative refractive power having a convex object-side surface 321 and a concave image-side surface 322, the object-side and image-side surfaces 321 and 322 thereof being aspheric;

a plastic third lens element 330 with positive refractive power having a convex object-side surface 331 and a concave image-side surface 332, the object-side and image-side surfaces 331 and 332 thereof being aspheric;

a plastic fourth lens element 340 with negative refractive power having a convex object-side surface 341 and a concave image-side surface 342, the object-side and image-side surfaces 341 and 342 thereof being aspheric;

a plastic fifth lens element 350 with positive refractive power having a concave object-side surface 351 and a convex image-side surface 352, the object-side and image-side surfaces 351 and 352 thereof being aspheric, and at least one inflection point is formed on the image-side surface 352 thereof; and a plastic sixth lens element 360 with negative refractive power having a concave object-side surface 361 and a concave image-side surface 362, the object-side and image-side surfaces 361 and 362 thereof being aspheric, and at least one inflection point is formed on the image-side surface 362 thereof;

wherein an aperture stop 300 is disposed between an object and the first lens element 310;

the image capturing lens assembly further comprises an IR filter 370 disposed between the image-side surface 362 of the sixth lens element 360 and an image plane 380, and the IR filter 370 is made of glass and has no influence on the focal length of the image capturing lens assembly; the image capturing lens assembly further comprises an image sensor provided on the image plane 380.

The detailed optical data of the third embodiment is shown in TABLE 6, and the aspheric surface data is shown in TABLE 7, wherein the units of the radius of curvature, the thickness and the focal length are expressed in mm, and HFOV is half of the maximal field of view.

TABLE 6

(Embodiment 3)
f = 4.69 mm, Fno = 2.60, HFOV = 31.0 deg.

| Surface # |  | Curvature Radius | Thickness | Material | Index | Abbe # | Focal length |
|---|---|---|---|---|---|---|---|
| 0 | Object | Plano | Infinity |  |  |  |  |
| 1 | Ape. Stop | Plano | −0.272 |  |  |  |  |
| 2 | Lens 1 | 1.710713 (ASP) | 0.657 | Plastic | 1.544 | 55.9 | 3.42 |
| 3 |  | 18.227625 (ASP) | 0.140 |  |  |  |  |
| 4 | Lens 2 | 18.361597 (ASP) | 0.284 | Plastic | 1.650 | 21.4 | −5.69 |
| 5 |  | 3.058182 (ASP) | 0.080 |  |  |  |  |
| 6 | Lens 3 | 5.593658 (ASP) | 0.382 | Plastic | 1.544 | 55.9 | 21.72 |
| 7 |  | 10.362361 (ASP) | 0.493 |  |  |  |  |
| 8 | Lens 4 | 106.739580 (ASP) | 0.321 | Plastic | 1.544 | 55.9 | −84.77 |
| 9 |  | 32.173517 (ASP) | 0.167 |  |  |  |  |
| 10 | Lens 5 | −2.901217 (ASP) | 0.963 | Plastic | 1.544 | 55.9 | 2.48 |
| 11 |  | −1.027778 (ASP) | 0.350 |  |  |  |  |
| 12 | Lens 6 | −4.551703 (ASP) | 0.474 | Plastic | 1.544 | 55.9 | −2.21 |
| 13 |  | 1.694920 (ASP) | 0.700 |  |  |  |  |
| 14 | IR-filter | Plano | 0.300 | Glass | 1.517 | 64.2 | — |
| 15 |  | Plano | 0.335 |  |  |  |  |
| 16 | Image | Plano | — |  |  |  |  |

Note:
Reference Wavelength is 587.6 nm (d-line)

TABLE 7

Aspheric Coefficients

| Surface # | 2 | 3 | 4 | 5 | 6 | 7 |
|---|---|---|---|---|---|---|
| k = | −8.32789E+00 | −1.00000E+00 | 0.00000E+00 | 7.24331E+00 | 1.17785E+00 | −3.38505E+01 |
| A4 = | 2.21182E−01 | 3.72194E−02 | −3.08691E−02 | −6.21778E−02 | 3.13199E−02 | 6.15749E−03 |
| A6 = | −1.85681E−01 | 3.94423E−02 | −6.39627E−02 | −9.14350E−03 | 3.26528E−02 | 1.03855E−02 |
| A8 = | 2.35598E−01 | −1.02993E−01 | 3.20677E−01 | 1.16248E−01 | 3.85470E−02 | −1.34614E−03 |
| A10 = | −1.74705E−01 | 2.54376E−01 | −9.10919E−01 | −3.41291E−01 | −2.99492E−02 | 7.35448E−03 |
| A12 = | 7.24179E−02 | −2.66069E−01 | 1.20563E+00 | 4.12557E−01 | −3.77136E−03 | −4.48894E−03 |
| A14 = | 3.32492E−03 | 1.44916E−01 | −6.11205E−01 | −2.18791E−01 |  |  |

| Surface # | 8 | 9 | 10 | 11 | 12 | 13 |
|---|---|---|---|---|---|---|
| k = | 0.00000E+00 | 0.00000E+00 | 3.66546E+00 | −3.64247E+00 | −2.85962E+00 | −1.08704E+01 |
| A4 = | −1.25790E−01 | −6.55916E−02 | 2.89743E−02 | −1.33698E−01 | −1.53453E−02 | −5.62750E−02 |
| A6 = | −2.05072E−01 | −1.49092E−01 | 2.24720E−02 | 1.19969E−01 | −2.95018E−02 | 1.60510E−02 |
| A8 = | 3.46984E−01 | 1.20463E−01 | −2.13283E−01 | −1.15776E−01 | 1.22222E−02 | −6.13849E−03 |
| A10 = | −4.26194E−01 | −6.00204E−02 | 3.14078E−01 | 6.73953E−02 | −7.59983E−04 | 1.53415E−03 |

TABLE 7-continued

| Aspheric Coefficients | | | | | | |
|---|---|---|---|---|---|---|
| A12 = | 1.75683E−01 | 1.87753E−02 | −1.68254E−01 | −1.73701E−02 | −2.03856E−04 | −2.03677E−04 |
| A14 = | | | 3.23478E−02 | 1.53474E−03 | 2.38432E−05 | 1.10959E−05 |

The equation of the aspheric surface profiles of the third embodiment has the same form as that of the first embodiment. Moreover, the definitions of the parameters of the relations are the same as those set forth in the first embodiment, but the value of the relations of the third embodiment are listed in the following table 8:

TABLE 8

(Embodiment 3)

| f | 4.69 | R10/CT5 | −1.07 |
|---|---|---|---|
| Fno | 2.60 | \|f/f3\| + \|f/f4\| | 0.27 |
| HFOV | 31.0 | \|f/f5\| + \|f/f6\| | 4.02 |
| V1 − V2 | 34.5 | (\|f5\| + \|f6\|)/(\|f3\| + \|f4\|) | 0.04 |
| V1 − (V2 + V3)/2 | 17.3 | (CT2 + CT3 + CT4)/f | 0.21 |
| \|R1/R2\| | 0.09 | SL/TTL | 0.95 |
| \|R10/R11\| | 0.23 | TTL/ImgH | 1.94 |

Embodiment 4

Figure 4A:
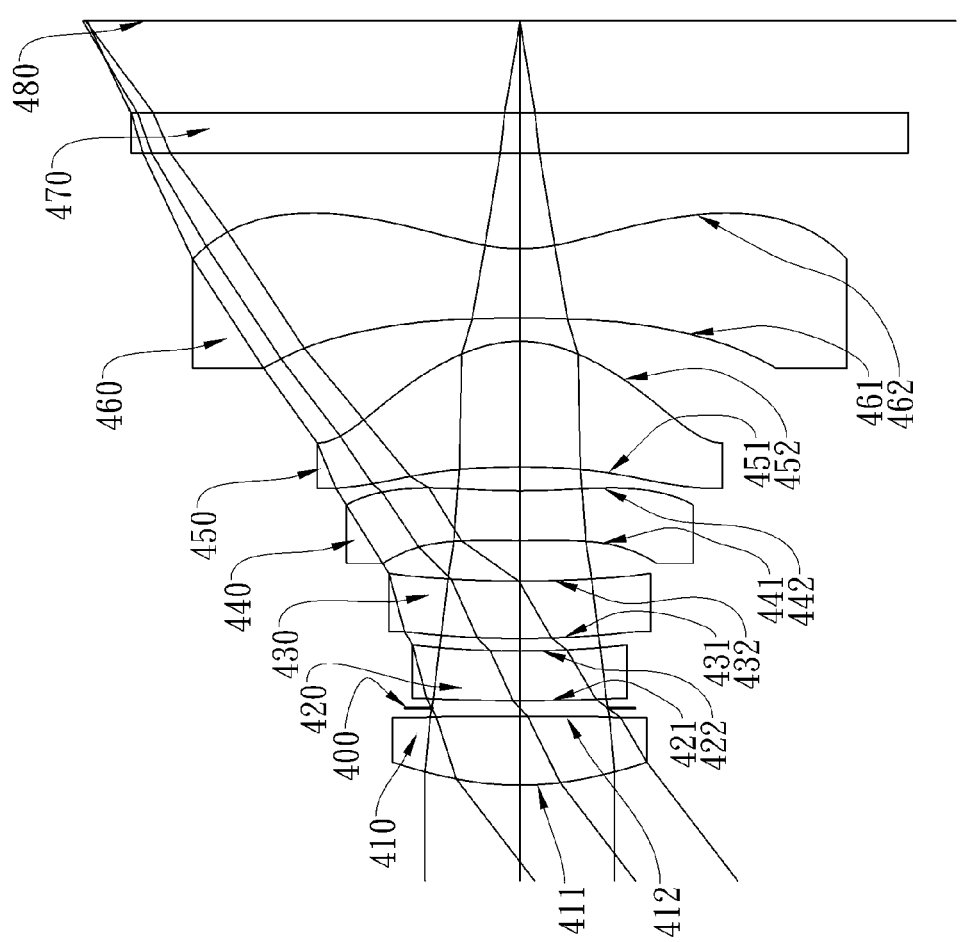
FIG. 4A shows an image capturing lens assembly in accordance with a fourth embodiment of the present invention.
Figure 4B:
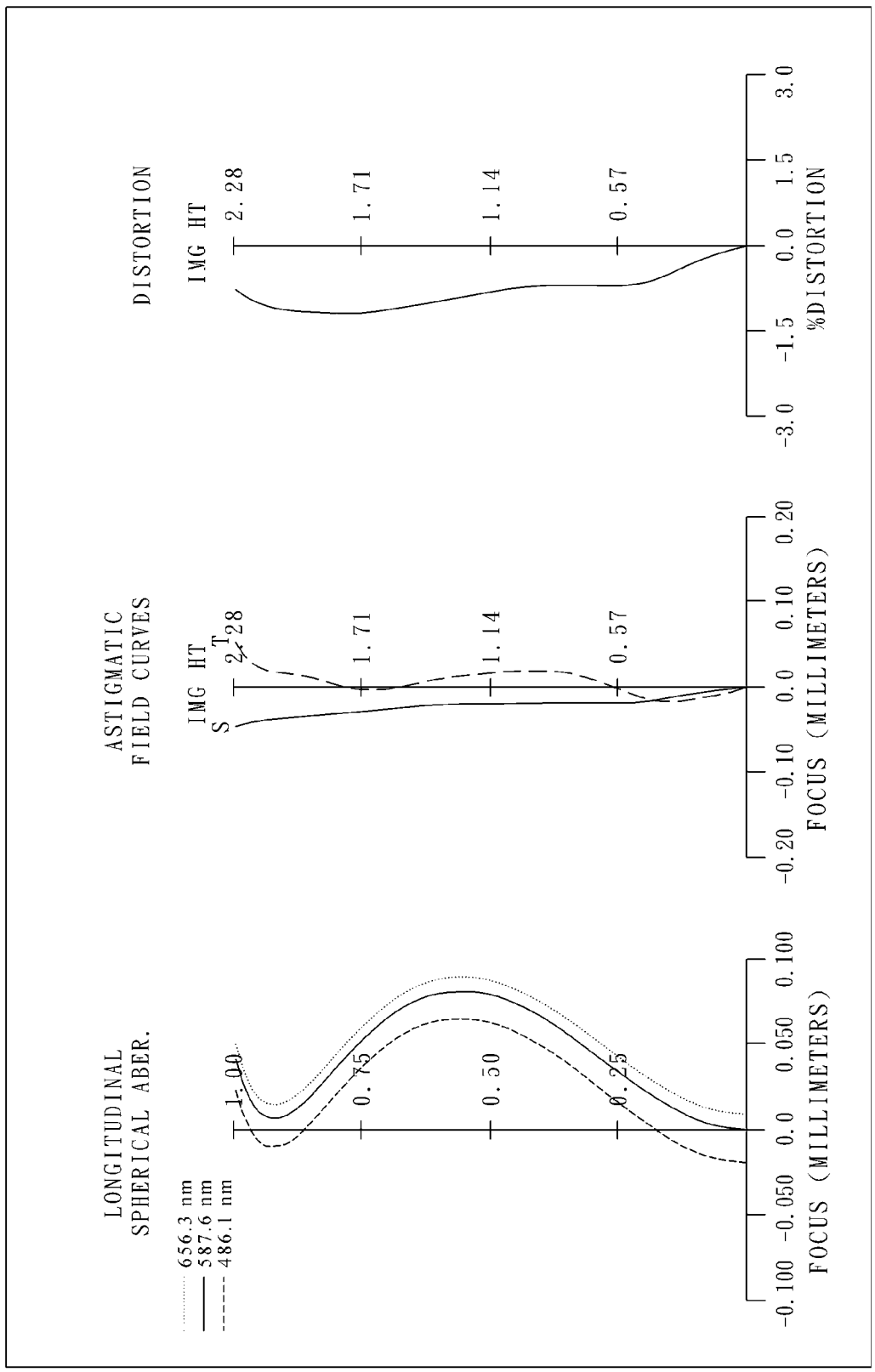
FIG. 4B shows the aberration curves of the fourth embodiment of the present invention.

FIG. 4A shows an image capturing lens assembly in accordance with the fourth embodiment of the present invention, and FIG. 4B shows the aberration curves of the fourth embodiment of the present invention. The image capturing lens assembly of the fourth embodiment of the present invention mainly comprises six lens elements, in order from an object side to an image side:

a plastic first lens element 410 with positive refractive power having a convex object-side surface 411 and a concave image-side surface 412, the object-side and image-side surfaces 411 and 412 thereof being aspheric;

a plastic second lens element 420 with negative refractive power having a convex object-side surface 421 and a concave image-side surface 422, the object-side and image-side surfaces 421 and 422 thereof being aspheric;

a plastic third lens element 430 with negative refractive power having a convex object-side surface 431 and a concave image-side surface 432, the object-side and image-side surfaces 431 and 432 thereof being aspheric;

a plastic fourth lens element 440 with negative refractive power having a convex object-side surface 441 and a concave image-side surface 442, the object-side and image-side surfaces 441 and 442 thereof being aspheric;

a plastic fifth lens element 450 with positive refractive power having a concave object-side surface 451 and a convex image-side surface 452, the object-side and image-side surfaces 451 and 452 thereof being aspheric, and at least one inflection point is formed on the image-side surface 452 thereof; and a plastic sixth lens element 460 with negative refractive power having a concave object-side surface 461 and a concave image-side surface 462, the object-side and image-side surfaces 461 and 462 thereof being aspheric, and at least one inflection point is formed on the image-side surface 462 thereof;

wherein an aperture stop 400 is disposed between the first lens element 410 and the second lens element 420;

the image capturing lens assembly further comprises an IR filter 470 disposed between the image-side surface 462 of the sixth lens element 460 and an image plane 480, and the IR filter 470 is made of glass and has no influence on the focal length of the image capturing lens assembly; the image capturing lens assembly further comprises an image sensor provided on the image plane 480.

The detailed optical data of the fourth embodiment is shown in TABLE 9, and the aspheric surface data is shown in TABLE 10, wherein the units of the radius of curvature, the thickness and the focal length are expressed in mm, and HFOV is half of the maximal field of view.

TABLE 9

(Embodiment 4)
f = 2.97 mm, Fno = 3.00, HFOV = 37.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.616811 (ASP) | 0.359 | Plastic | 1.544 | 55.9 | 3.30 |
| 2 | | 15.103118 (ASP) | 0.044 | | | | |
| 3 | Ape. Stop | Plano | 0.038 | | | | |
| 4 | Lens 2 | 6.674665 (ASP) | 0.260 | Plastic | 1.634 | 23.8 | −26.62 |
| 5 | | 4.711021 (ASP) | 0.066 | | | | |
| 6 | Lens 3 | 5.045327 (ASP) | 0.300 | Plastic | 1.634 | 23.8 | −98.42 |
| 7 | | 4.560225 (ASP) | 0.212 | | | | |
| 8 | Lens 4 | 12.744354 (ASP) | 0.260 | Plastic | 1.634 | 23.8 | −7.10 |
| 9 | | 3.299779 (ASP) | 0.125 | | | | |
| 10 | Lens 5 | −5.083431 (ASP) | 0.658 | Plastic | 1.544 | 55.9 | 1.31 |
| 11 | | −0.652865 (ASP) | 0.121 | | | | |
| 12 | Lens 6 | −10.653382 (ASP) | 0.363 | Plastic | 1.544 | 55.9 | −1.44 |
| 13 | | 0.856067 (ASP) | 0.500 | | | | |
| 14 | IR-filter | Plano | 0.210 | Glass | 1.517 | 64.2 | — |
| 15 | | Plano | 0.482 | | | | |
| 16 | Image | Plano | — | | | | |

Note:
Reference Wavelength is 587.6 nm (d-line)

TABLE 10

Aspheric Coefficients

| Surface # | 1 | 2 | 4 | 5 | 6 | 7 |
|---|---|---|---|---|---|---|
| k = | −1.84551E+01 | 0.00000E+00 | 0.00000E+00 | −3.05562E+00 | 2.18637E+00 | 1.48693E+01 |
| A4 = | 3.77260E−01 | −3.63454E−01 | −3.50275E−01 | −8.40076E−03 | 5.72407E−03 | −2.35008E−01 |
| A6 = | −8.68073E−01 | 1.08829E+00 | 1.54881E+00 | −1.09377E−02 | 8.04536E−03 | 4.97493E−01 |
| A8 = | 9.27643E−01 | −2.68557E+00 | −1.91800E+00 | 2.41985E−02 | −1.60284E−02 | 1.12714E−01 |
| A10 = | −2.11991E−01 | 2.27172E+00 | −9.86526E−01 | 2.69982E−01 | −1.76529E−01 | −2.05486E+00 |
| A12 = | −1.18004E+00 | −2.34090E+00 | 4.31588E+00 | −3.71826E−01 | 2.05019E−01 | 3.24235E+00 |
| A14 = | 1.92217E+00 | 2.35176E+01 | −1.51135E+01 | | | −1.53416E+00 |

| Surface # | 8 | 9 | 10 | 11 | 12 | 13 |
|---|---|---|---|---|---|---|
| k = | 0.00000E+00 | 0.00000E+00 | −8.88118E+01 | −2.98780E+00 | 0.00000E+00 | −7.28120E+00 |
| A4 = | −5.83783E−01 | −4.27941E−01 | −4.15507E−01 | −3.48750E−01 | −1.33841E−01 | −1.79577E−01 |
| A6 = | 2.47327E−01 | 4.64610E−01 | 9.33213E−01 | 3.92467E−01 | 8.87750E−02 | 1.28566E−01 |
| A8 = | −1.52682E+00 | −9.45441E−01 | −1.28187E+00 | −4.43618E−01 | 1.51810E−02 | −6.95145E−02 |
| A10 = | 3.45850E+00 | 1.19780E+00 | 1.21224E+00 | 5.18385E−01 | −6.13613E−02 | 2.26651E−02 |
| A12 = | −1.96437E+00 | −6.08548E−01 | −5.67406E−01 | −1.87327E−01 | 2.85923E−02 | −4.28691E−03 |
| A14 = | | | 6.76630E−02 | | −3.81936E−03 | 3.40896E−04 |

The equation of the aspheric surface profiles of the fourth embodiment has the same form as that of the first embodiment. Moreover, the definitions of the parameters of the relations are the same as those set forth in the first embodiment, but the value of the relations of the fourth embodiment are listed in the following table 11:

TABLE 11

(Embodiment 4)

| | | | |
|---|---|---|---|
| f | 2.97 | R10/CT5 | −0.99 |
| Fno | 3.00 | |f/f3| + |f/f4| | 0.45 |
| HFOV | 37.4 | |f/f5| + |f/f6| | 4.33 |
| V1 −V2 | 32.1 | (|f5| + |f6|)/(|f3| + |f4|) | 0.03 |
| V1 − (V2 + V3)/2 | 32.1 | (CT2 + CT3 + CT4)/f | 0.28 |
| |R1/R2| | 0.11 | SL/TTL | 0.90 |
| |R10/R11| | 0.06 | TTL/ImgH | 1.72 |

Embodiment 5

Figure 5A:
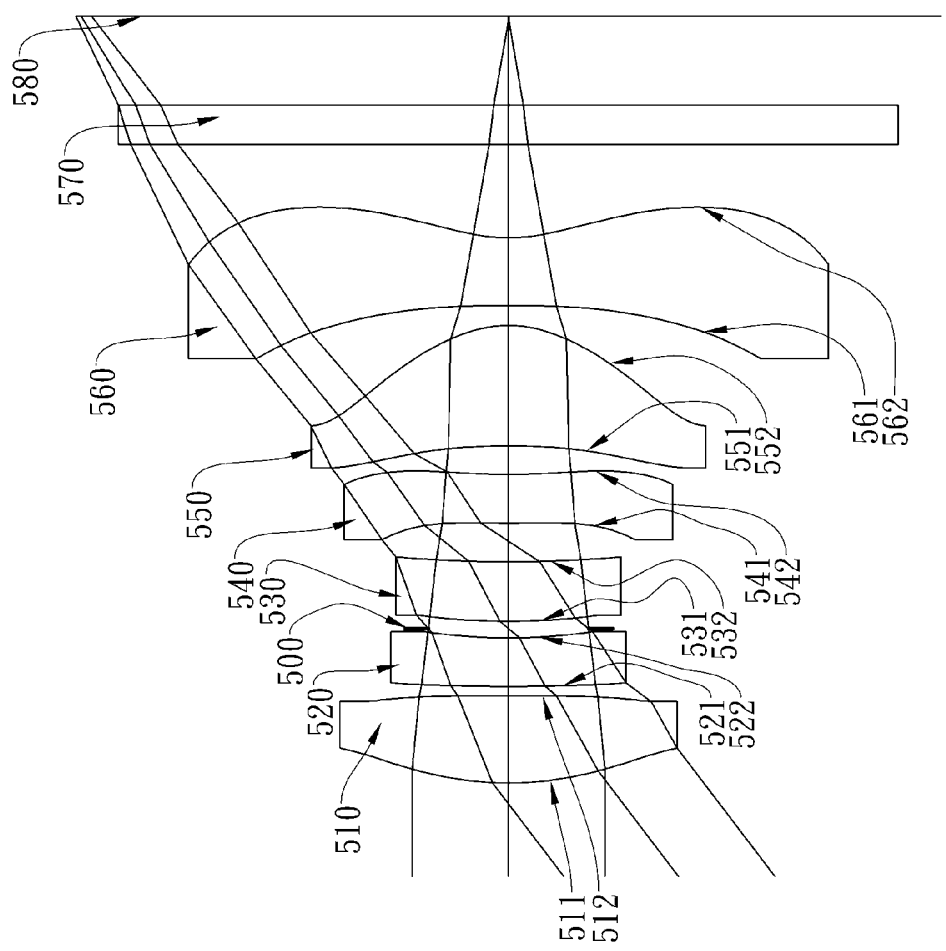
FIG. 5A shows an image capturing lens assembly in accordance with a fifth embodiment of the present invention.
Figure 5B:
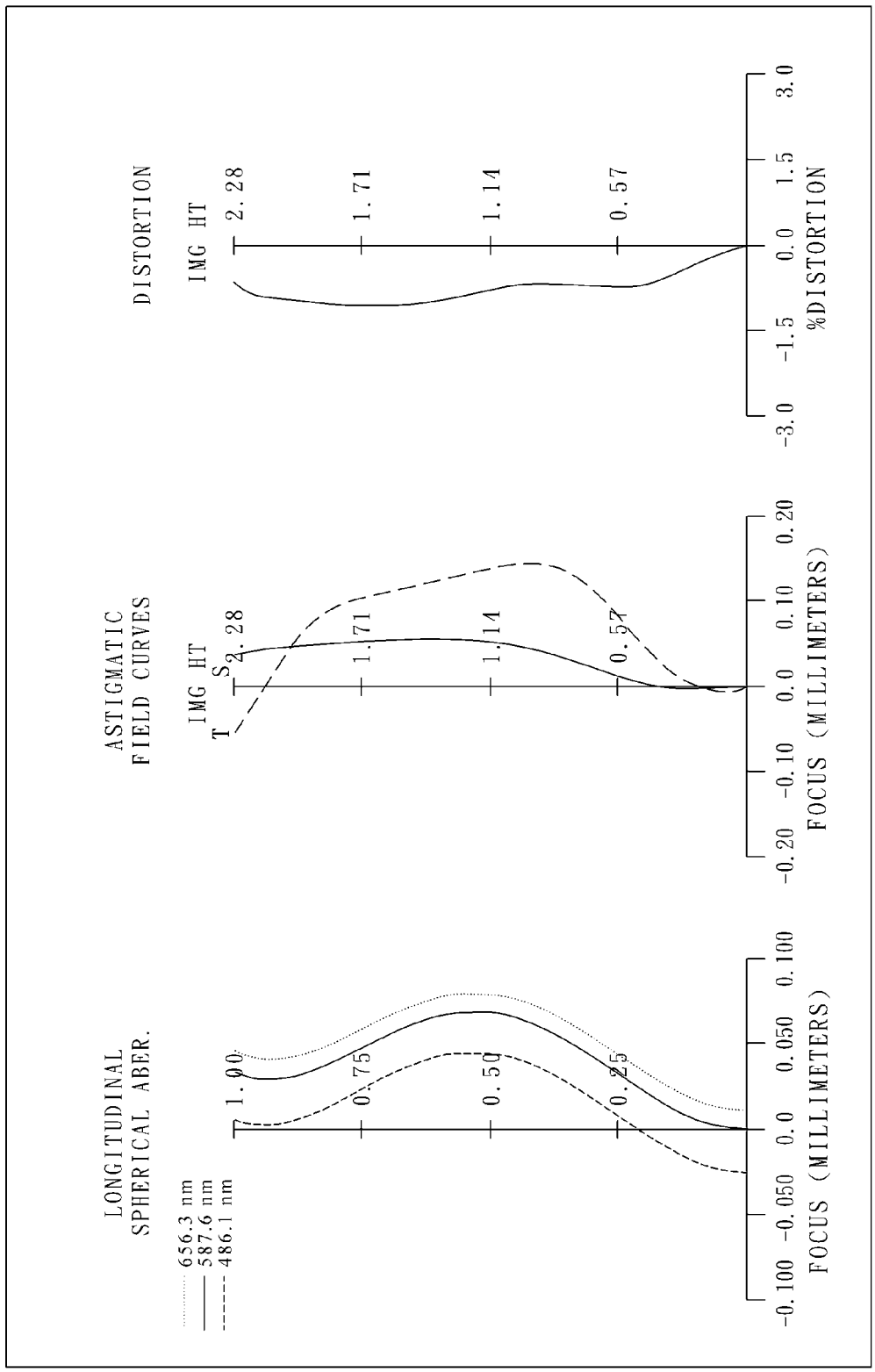
FIG. 5B shows the aberration curves of the fifth embodiment of the present invention.

FIG. 5A shows an image capturing lens assembly in accordance with the fifth embodiment of the present invention, and FIG. 5B shows the aberration curves of the fifth embodiment of the present invention. The image capturing lens assembly of the fifth embodiment of the present invention mainly comprises six lens elements, in order from an object side to an image side:

a plastic first lens element 510 with positive refractive power having a convex object-side surface 511 and a concave image-side surface 512, the object-side and image-side surfaces 511 and 512 thereof being aspheric;

a plastic second lens element 520 with negative refractive power having a convex object-side surface 521 and a concave image-side surface 522, the object-side and image-side surfaces 521 and 522 thereof being aspheric;

a plastic third lens element 530 with positive refractive power having a convex object-side surface 531 and a concave image-side surface 532, the object-side and image-side surfaces 531 and 532 thereof being aspheric;

a plastic fourth lens element 540 with negative refractive power having a convex object-side surface 541 and a concave image-side surface 542, the object-side and image-side surfaces 541 and 542 thereof being aspheric;

a plastic fifth lens element 550 with positive refractive power having a concave object-side surface 551 and a convex image-side surface 552, the object-side and image-side surfaces 551 and 552 thereof being aspheric, and at least one inflection point is formed on the image-side surface 552 thereof; and a plastic sixth lens element 560 with negative refractive power having a concave object-side surface 561 and a concave image-side surface 562, the object-side and image-side surfaces 561 and 562 thereof being aspheric, and at least one inflection point is formed on the image-side surface 562 thereof;

wherein an aperture stop 500 is disposed between the second lens element 520 and the third lens element 530;

the image capturing lens assembly further comprises an IR filter 570 disposed between the image-side surface 562 of the sixth lens element 560 and an image plane 580, and the IR filter 570 is made of glass and has no influence on the focal length of the image capturing lens assembly; the image capturing lens assembly further comprises an image sensor provided on the image plane 580.

The detailed optical data of the fifth embodiment is shown in TABLE 12, and the aspheric surface data is shown in TABLE 13, wherein the units of the radius of curvature, the thickness and the focal length are expressed in mm, and HFOV is half of the maximal field of view.

TABLE 12

(Embodiment 5)
f = 2.99 mm, Fno = 2.90, HFOV = 37.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.678652 (ASP) | 0.466 | Plastic | 1.544 | 55.9 | 3.25 |
| 2 | | 30.001695 (ASP) | 0.050 | | | | |

TABLE 12-continued (Embodiment 5)
f = 2.99 mm, Fno = 2.90, HFOV = 37.2 deg.

| Surface # | | Curvature Radius | Thickness | Material | Index | Abbe # | Focal length |
|---|---|---|---|---|---|---|---|
| 3 | Lens 2 | 7.007736 (ASP) | 0.260 | Plastic | 1.634 | 23.8 | −8.48 |
| 4 | | 2.998757 (ASP) | 0.050 | | | | |
| 5 | Ape. Stop | Plano | 0.039 | | | | |
| 6 | Lens 3 | 3.506372 (ASP) | 0.318 | Plastic | 1.614 | 25.6 | 18.04 |
| 7 | | 4.953410 (ASP) | 0.208 | | | | |
| 8 | Lens 4 | 9.955567 (ASP) | 0.260 | Plastic | 1.514 | 56.8 | −8.77 |
| 9 | | 3.072983 (ASP) | 0.153 | | | | |
| 10 | Lens 5 | −4.077037 (ASP) | 0.644 | Plastic | 1.544 | 55.9 | 1.26 |
| 11 | | −0.620079 (ASP) | 0.107 | | | | |
| 12 | Lens 6 | −8.337085 (ASP) | 0.362 | Plastic | 1.544 | 55.9 | −1.38 |
| 13 | | 0.836973 (ASP) | 0.500 | | | | |
| 14 | IR-filter | Plano | 0.210 | Glass | 1.517 | 64.2 | — |
| 15 | | Plano | 0.475 | | | | |
| 16 | Image | Plano | — | | | | |

Note:
Reference Wavelength is 587.6 nm (d-line)

TABLE 13

Aspheric Coefficients

| Surface # | 1 | 2 | 3 | 4 | 6 | 7 |
|---|---|---|---|---|---|---|
| k = | −2.00089E+01 | −1.00000E+00 | 4.46964E+01 | −2.10166E−01 | −1.02744E+00 | 1.80960E+01 |
| A4 = | 3.80108E−01 | −3.57333E−01 | −3.55427E−01 | 4.12796E−04 | −3.28069E−03 | −2.29681E−01 |
| A6 = | −8.14960E−01 | 1.14385E+00 | 1.53453E+00 | −2.70401E−03 | 4.66075E−03 | 4.97632E−01 |
| A8 = | 9.66010E−01 | −2.26356E+00 | −2.05244E+00 | −2.20458E−02 | 4.47854E−02 | 7.14147E−02 |
| A10 = | −6.25729E−02 | 2.93440E+00 | −2.02999E+00 | −6.19677E−02 | 1.65847E−01 | −2.23522E+00 |
| A12 = | −1.37423E+00 | −4.17981E+00 | 1.69353E+00 | −3.24046E−01 | 2.84522E−01 | 2.68362E+00 |
| A14 = | 1.00185E+00 | 3.60537E+00 | 8.74710E+00 | | | 1.47665E+00 |

| Surface # | 8 | 9 | 10 | 11 | 12 | 13 |
|---|---|---|---|---|---|---|
| k = | −2.02410E+01 | −2.63343E−01 | −7.94962E+01 | −3.05268E+00 | 1.49738E+01 | −8.28362E+00 |
| A4 = | −5.83493E−01 | −4.29299E−01 | −4.15408E−01 | −3.48302E−01 | −1.33598E−01 | −1.88159E−01 |
| A6 = | 2.46704E+00 | 4.62472E−01 | 9.33003E−01 | 3.92587E−01 | 8.97814E−02 | 1.29827E−01 |
| A8 = | −1.52896E+00 | −9.45293E−01 | −1.28378E+00 | −4.42735E−01 | 1.68387E−02 | −6.92200E−02 |
| A10 = | 3.48616E+00 | 1.20174E+00 | 1.20691E+00 | 5.21271E−01 | −6.01168E−02 | 2.29845E−02 |
| A12 = | −1.71560E+00 | −6.24587E−01 | −5.60991E−01 | −1.91639E−01 | 2.74569E−02 | −4.54883E−03 |
| A14 = | | | 6.85525E−02 | | −3.64822E−03 | 3.73653E−04 |

The equation of the aspheric surface profiles of the fifth embodiment has the same form as that of the first embodiment. Moreover, the definitions of the parameters of the relations are the same as those set forth in the first embodiment, but the value of the relations of the fifth embodiment are listed in the following table 14:

TABLE 14

(Embodiment 5)

| f | 2.99 | R10/CT5 | −0.96 |
|---|---|---|---|
| Fno | 2.90 | \|f/f3\| + \|f/f4\| | 0.51 |
| HFOV | 37.2 | \|f/f5\| + \|f/f6\| | 4.53 |
| V1 − V2 | 32.1 | (\|f5\| + \|f6\|)/(\|f3\| + \|f4\|) | 0.10 |
| V1 − (V2 + V3)/2 | 31.2 | (CT2 + CT3 + CT4)/f | 0.28 |
| \|R1/R2\| | 0.06 | SL/TTL | 0.80 |
| \|R10/R11\| | 0.07 | TTL/ImgH | 1.77 |

Embodiment 6

Figure 6A:
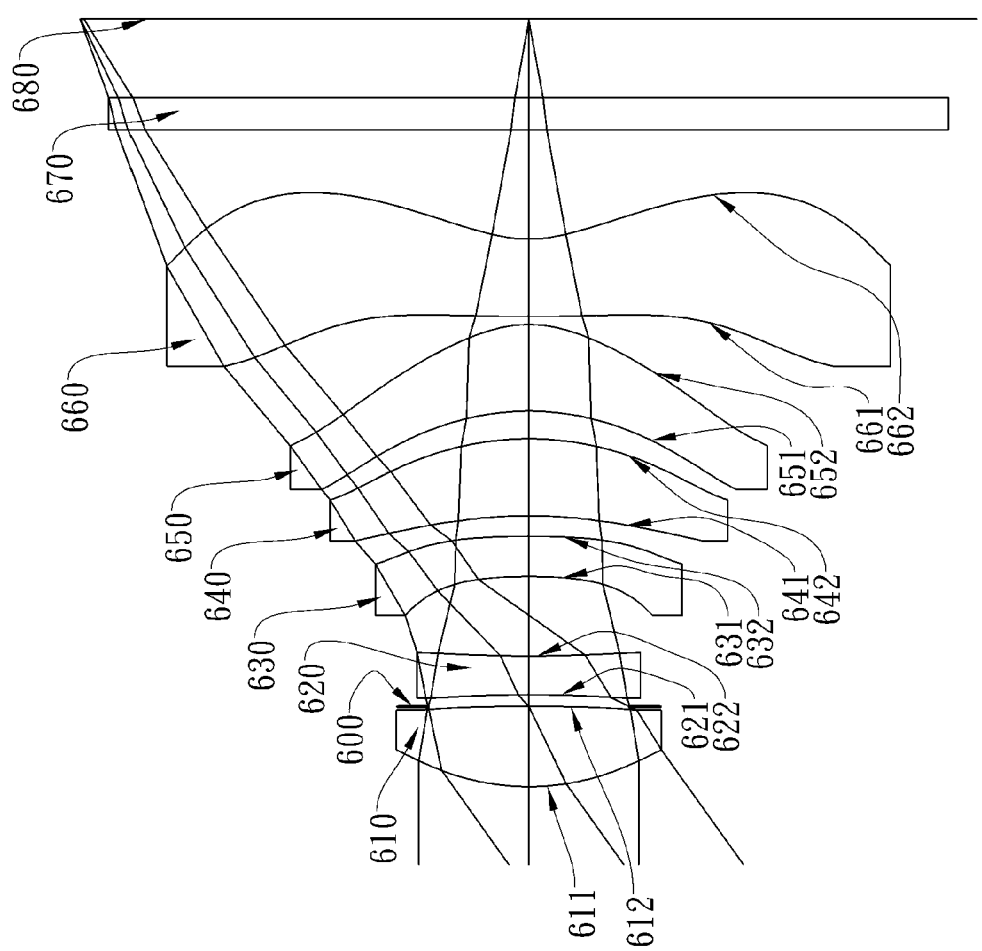
FIG. 6A shows an image capturing lens assembly in accordance with a sixth embodiment of the present invention.
Figure 6B:
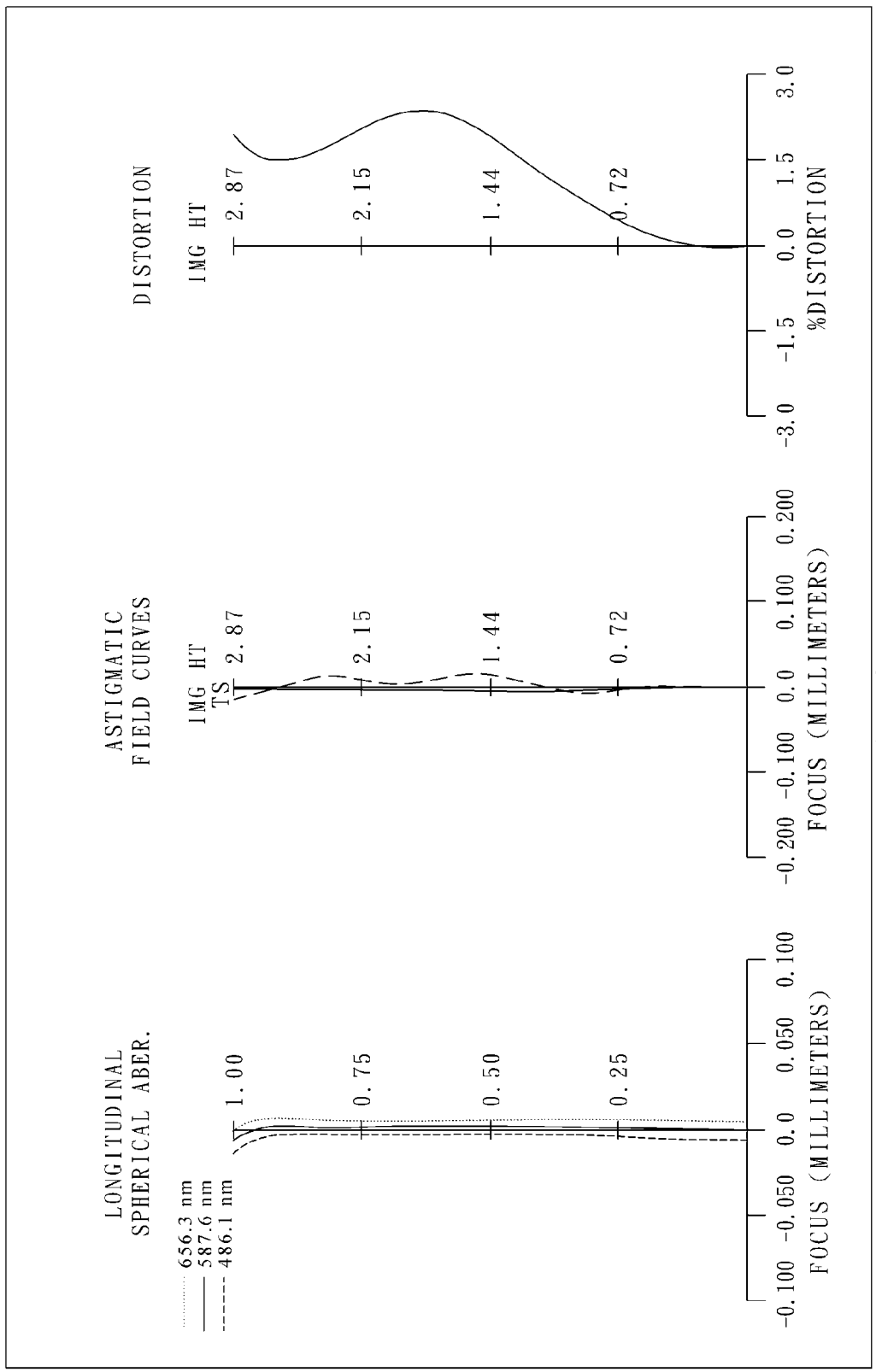
FIG. 6B shows the aberration curves of the sixth embodiment of the present invention.

FIG. 6A shows an image capturing lens assembly in accordance with the sixth embodiment of the present invention, and FIG. 6B shows the aberration curves of the sixth embodiment of the present invention. The image capturing lens assembly of the sixth embodiment of the present invention mainly comprises six lens elements, in order from an object side to an image side:

a plastic first lens element 610 with positive refractive power having a convex object-side surface 611 and a convex image-side surface 612, the object-side and image-side surfaces 611 and 612 thereof being aspheric;

a plastic second lens element 620 with negative refractive power having a concave object-side surface 621 and a concave image-side surface 622, the object-side and image-side surfaces 621 and 622 thereof being aspheric;

a plastic third lens element 630 with negative refractive power having a concave object-side surface 631 and a convex image-side surface 632, the object-side and image-side surfaces 631 and 632 thereof being aspheric;

a plastic fourth lens element 640 with positive refractive power having a concave object-side surface 641 and a convex image-side surface 642, the object-side and image-side surfaces 641 and 642 thereof being aspheric;

a plastic fifth lens element 650 with positive refractive power having a concave object-side surface 651 and a convex image-side surface 652, the object-side and image-side surfaces 651 and 652 thereof being aspheric, and at least one inflection point is formed on the image-side surface 652 thereof; and a plastic sixth lens element 660 with negative refractive power having a convex object-side surface 661 and a concave image-side surface 662, the object-side and image-side surfaces 661 and 662 thereof being aspheric, and at least one inflection point is formed on both the object-side surface 661 and the image-side surface 662 thereof;

wherein an aperture stop 600 is disposed between the first lens element 610 and the second lens element 620;

the image capturing lens assembly further comprises an IR filter 670 disposed between the image-side surface 662 of the sixth lens element 660 and an image plane 680, and the IR filter 670 is made of glass and has no influence on the focal length of the image capturing lens assembly; the image capturing lens assembly further comprises an image sensor provided on the image plane 680.

The detailed optical data of the sixth embodiment is shown in TABLE 15, and the aspheric surface data is shown in TABLE 16, wherein the units of the radius of curvature, the thickness and the focal length are expressed in mm, and HFOV is half of the maximal field of view.

TABLE 15

(Embodiment 6)
f = 3.95 mm, Fno = 2.80, HFOV = 35.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.536200 (ASP) | 0.515 | Plastic | 1.544 | 55.9 | 2.56 |
| 2 | | −13.362900 (ASP) | −0.001 | | | | |
| 3 | Ape. Stop | Plano | 0.075 | | | | |
| 4 | Lens 2 | −8.389300 (ASP) | 0.250 | Plastic | 1.633 | 23.4 | −6.61 |
| 5 | | 8.440300 (ASP) | 0.510 | | | | |
| 6 | Lens 3 | −3.524800 (ASP) | 0.258 | Plastic | 1.634 | 23.8 | −11.27 |
| 7 | | −7.154700 (ASP) | 0.132 | | | | |
| 8 | Lens 4 | −3.061300 (ASP) | 0.494 | Plastic | 1.544 | 55.9 | 9.08 |
| 9 | | −1.997680 (ASP) | 0.178 | | | | |
| 10 | Lens 5 | −1.677850 (ASP) | 0.557 | Plastic | 1.544 | 55.9 | 2.08 |
| 11 | | −0.754040 (ASP) | 0.050 | | | | |
| 12 | Lens 6 | 10.526300 (ASP) | 0.498 | Plastic | 1.535 | 56.3 | −1.70 |
| 13 | | 0.822090 (ASP) | 0.700 | | | | |
| 14 | IR-filter | Plano | 0.210 | Glass | 1.517 | 64.2 | — |
| 15 | | Plano | 0.502 | | | | |
| 16 | Image | Plano | — | | | | |

Note:
Reference Wavelength is 587.6 nm (d-line)

TABLE 16

Aspheric Coefficients

| Surface # | 1 | 2 | 4 | 5 | 6 | 7 |
|---|---|---|---|---|---|---|
| k = | −6.76733E+00 | 2.50516E+01 | 4.79246E+01 | −1.00000E+02 | −1.00000E+00 | −1.10335E+01 |
| A4 = | 2.25349E−01 | −2.16164E−02 | 1.16518E−02 | −4.84819E−03 | −3.18795E−01 | −1.74282E−01 |
| A6 = | −2.13470E−01 | 1.97099E−02 | 8.70036E−03 | −3.57830E−02 | −2.06893E−01 | −4.25481E−02 |
| A8 = | 1.83909E−01 | −1.41822E−01 | 3.23981E−01 | 1.83209E−01 | 3.63879E−01 | 1.18360E−01 |
| A10 = | −1.47020E−01 | 3.80872E−01 | −9.95299E−01 | −5.39420E−01 | −6.25335E−01 | −6.96751E−02 |
| A12 = | 2.93978E−02 | −5.65306E−01 | 1.42245E+00 | 4.58355E−01 | 3.49471E−01 | 5.46121E−02 |
| A14 = | −2.07518E−02 | 3.20589E−01 | −6.99006E−01 | −1.14126E−01 | | |

| Surface # | 8 | 9 | 10 | 11 | 12 | 13 |
|---|---|---|---|---|---|---|
| k = | 4.58466E+00 | −2.18333E−03 | 2.37100E−01 | −3.91262E+00 | −1.00001E+00 | −6.57332E+00 |
| A4 = | 5.49511E−02 | −1.95873E−02 | 2.42258E−02 | −1.31643E−01 | −4.04985E−02 | −6.30975E−02 |
| A6 = | 6.45882E−02 | 1.51708E−02 | 1.94350E−03 | 1.57331E−01 | −2.65680E−02 | 1.94809E−02 |
| A8 = | −2.11647E−01 | 3.95151E−03 | 4.99062E−03 | −1.38987E−01 | 1.22995E−02 | −7.15360E−03 |
| A10 = | 2.93254E−01 | 2.37644E−03 | 4.42265E−03 | 6.88661E−02 | −9.84105E−04 | 1.65201E−03 |
| A12 = | −1.78246E−01 | | | −1.45365E−02 | −1.56060E−04 | −2.20339E−04 |
| A14 = | 4.17346E−02 | | | 8.38551E−04 | 2.01264E−05 | 1.27548E−05 |

The equation of the aspheric surface profiles of the sixth embodiment has the same form as that of the first embodiment. Moreover, the definitions of the parameters of the relations are the same as those set forth in the first embodiment, but the value of the relations of the sixth embodiment are listed in the following table 17:

TABLE 17

(Embodiment 6)

| | | | |
|---|---|---|---|
| f | 3.95 | R10/CT5 | −1.35 |
| Fno | 2.80 | $|f/f3| + |f/f4|$ | 0.79 |
| HFOV | 35.5 | $|f/f5| + |f/f6|$ | 4.23 |
| V1 − V2 | 32.5 | $(|f5| + |f6|)/(|f3| + |f4|)$ | 0.19 |
| V1 − (V2 + V3)/2 | 32.3 | (CT2 + CT3 + CT4)/f | 0.25 |
| |R1/R2| | 0.11 | SL/TTL | 0.89 |
| |R10/R11| | 0.07 | TTL/ImgH | 1.69 |

Embodiment 7

Figure 7A:
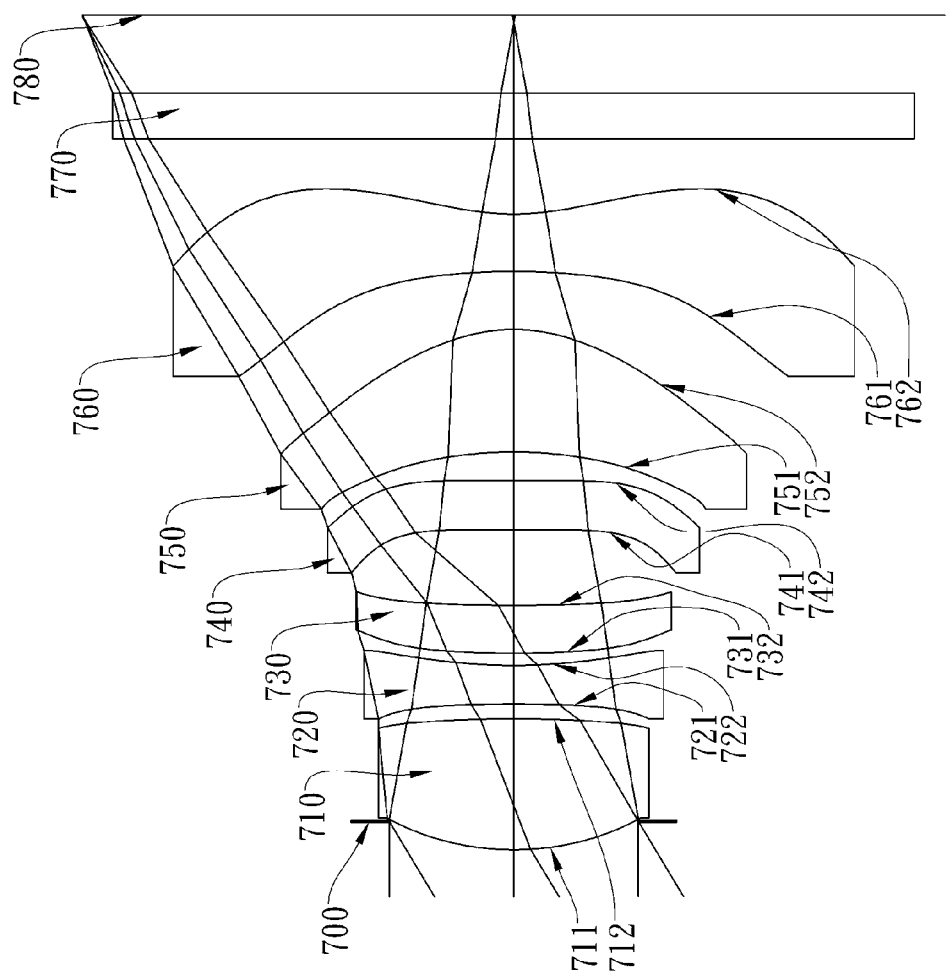
FIG. 7A shows an image capturing lens assembly in accordance with a seventh embodiment of the present invention.
Figure 7B:
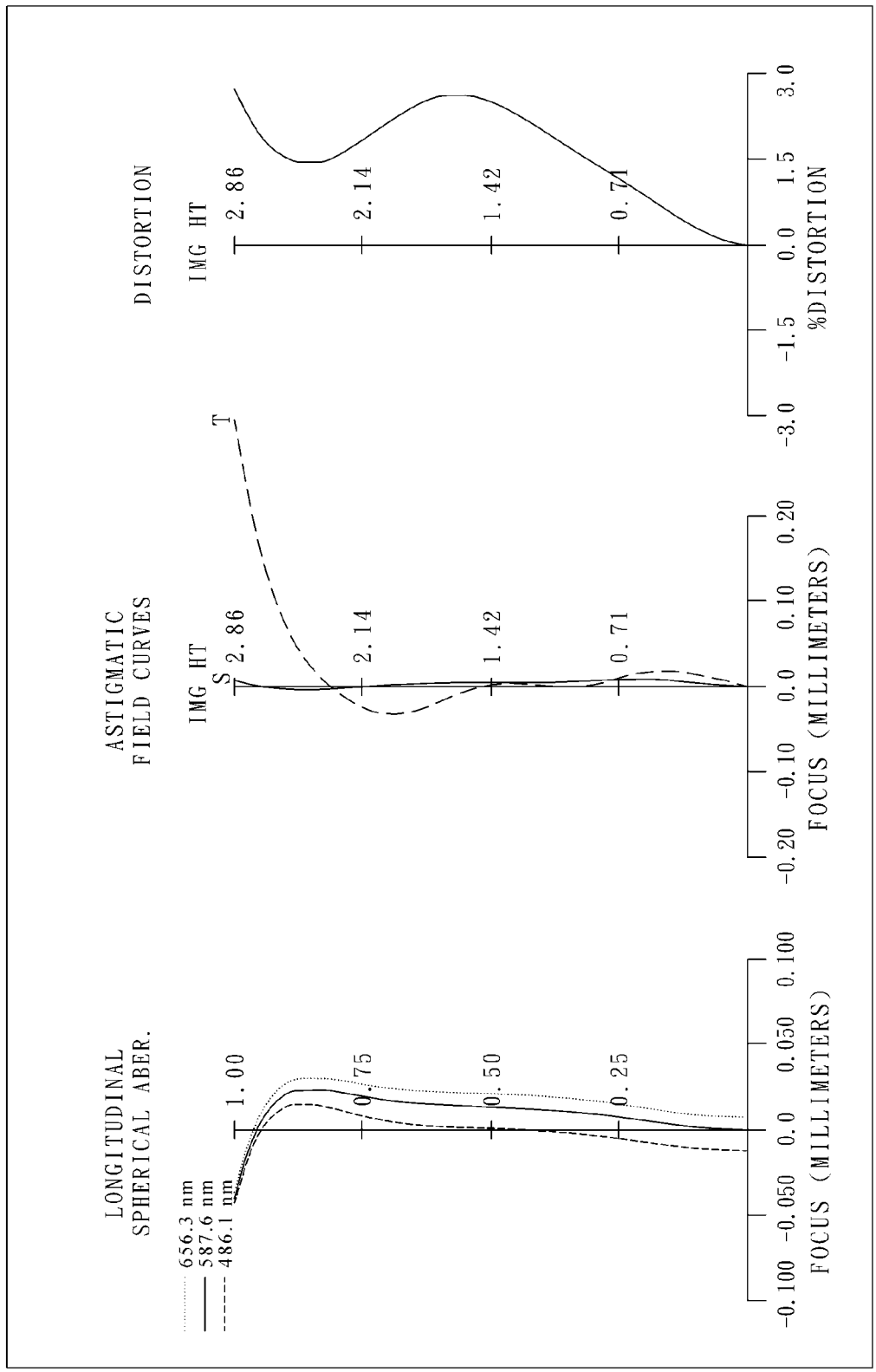
FIG. 7B shows the aberration curves of the seventh embodiment of the present invention.

FIG. 7A shows an image capturing lens assembly in accordance with the seventh embodiment of the present invention, and FIG. 7B shows the aberration curves of the seventh embodiment of the present invention. The image capturing lens assembly of the seventh embodiment of the present invention mainly comprises six lens elements, in order from an object side to an image side:

a plastic first lens element 710 with positive refractive power having a convex object-side surface 711 and a convex image-side surface 712, the object-side and image-side surfaces 711 and 712 thereof being aspheric;

a plastic second lens element 720 with negative refractive power having a concave object-side surface 721 and a concave image-side surface 722, the object-side and image-side surfaces 721 and 722 thereof being aspheric;

a plastic third lens element 730 with positive refractive power having a convex object-side surface 731 and a concave image-side surface 732, the object-side and image-side surfaces 731 and 732 thereof being aspheric;

a plastic fourth lens element 740 with positive refractive power having a convex object-side surface 741 and a concave image-side surface 742, the object-side and image-side surfaces 741 and 742 thereof being aspheric;

a plastic fifth lens element 750 with positive refractive power having a concave object-side surface 751 and a convex image-side surface 752, the object-side and image-side surfaces 751 and 752 thereof being aspheric; and a plastic sixth lens element 760 with negative refractive power having a concave object-side surface 761 and a concave image-side surface 762, the object-side and image-side surfaces 761 and 762 thereof being aspheric, and at least one inflection point is formed on the image-side surface 762 thereof;

wherein an aperture stop 700 is disposed between an object and the first lens element 710;

the image capturing lens assembly further comprises an IR filter 770 disposed between the image-side surface 762 of the sixth lens element 760 and an image plane 780, and the IR filter 770 is made of glass and has no influence on the focal length of the image capturing lens assembly; the image capturing lens assembly further comprises an image sensor provided on the image plane 780.

The detailed optical data of the seventh embodiment is shown in TABLE 18, and the aspheric surface data is shown in TABLE 19, wherein the units of the radius of curvature, the thickness and the focal length are expressed in mm, and HFOV is half of the maximal field of view.

TABLE 18

(Embodiment 7)
f = 4.62 mm, Fno = 2.80, HFOV = 31.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.188 | | | | |
| 2 | Lens 1 | 1.800353 (ASP) | 0.868 | Plastic | 1.535 | 56.3 | 2.82 |
| 3 | | −7.765433 (ASP) | 0.098 | | | | |
| 4 | Lens 2 | −9.877914 (ASP) | 0.256 | Plastic | 1.633 | 23.4 | −4.02 |
| 5 | | 3.460516 (ASP) | 0.080 | | | | |
| 6 | Lens 3 | 6.785473 (ASP) | 0.318 | Plastic | 1.535 | 56.3 | 30.72 |
| 7 | | 11.373524 (ASP) | 0.499 | | | | |
| 8 | Lens 4 | 14.753545 (ASP) | 0.326 | Plastic | 1.530 | 55.8 | 102.76 |
| 9 | | 20.080348 (ASP) | 0.192 | | | | |
| 10 | Lens 5 | −2.713527 (ASP) | 0.813 | Plastic | 1.583 | 30.2 | 2.64 |
| 11 | | −1.090981 (ASP) | 0.384 | | | | |
| 12 | Lens 6 | −4.820665 (ASP) | 0.381 | Plastic | 1.530 | 55.8 | −2.27 |
| 13 | | 1.643180 (ASP) | 0.500 | | | | |
| 14 | IR-filter | Plano | 0.300 | Glass | 1.517 | 64.2 | — |
| 15 | | Plano | 0.518 | | | | |
| 16 | Image | Plano | — | | | | |

Note:
Reference Wavelength is 587.6 nm (d-line)

TABLE 19

Aspheric Coefficients

| Surface # | 2 | 3 | 4 | 5 | 6 | 7 |
|---|---|---|---|---|---|---|
| k = | −9.87635E+00 | −1.00000E+00 | 0.00000E+00 | 9.37600E+00 | −2.29638E+01 | −9.00000E+01 |
| A4 = | 2.05995E−01 | 3.20593E−02 | −2.56828E−02 | −8.37171E−02 | 2.00084E−02 | 5.59746E−03 |
| A6 = | −1.96195E−01 | −1.35654E−02 | −9.23026E−02 | −6.22354E−03 | 4.77555E−02 | 2.25417E−02 |

TABLE 19-continued

| Aspheric Coefficients | | | | | | |
|---|---|---|---|---|---|---|
| A8 = | 2.19875E−01 | −9.21889E−02 | 3.02357E−01 | 1.20731E−01 | 5.39392E−02 | 1.58730E−02 |
| A10 = | −1.76655E−01 | 1.58588E−01 | −9.36190E−01 | −3.40311E−01 | −3.79585E−02 | 2.05079E−03 |
| A12 = | 7.25033E−02 | −2.60797E−01 | 1.20853E+00 | 4.13416E−01 | −1.09903E−02 | −7.57434E−03 |
| A14 = | 1.93584E−03 | 1.43660E−01 | −6.10749E−01 | −2.18416E−01 | | |

| Surface # | 8 | 9 | 10 | 11 | 12 | 13 |
|---|---|---|---|---|---|---|
| k = | 0.00000E+00 | 0.00000E+00 | 3.38423E+00 | −3.95812E+00 | 1.31936E+00 | −9.06320E+00 |
| A4 = | −1.38324E−01 | −8.24612E−02 | 4.32162E−02 | −1.15320E−01 | −1.97175E−02 | −6.31362E−02 |
| A6 = | −1.78541E−01 | −1.40821E−01 | 1.72458E−02 | 1.13247E−01 | −3.06311E−02 | 1.73972E−02 |
| A8 = | 3.34573E−01 | 1.19029E−01 | −2.16545E−01 | −1.15218E−01 | 1.21401E−02 | −6.37649E−03 |
| A10 = | −4.23081E−01 | −6.48582E−02 | 3.14339E−01 | 6.76098E−02 | −7.35884E−04 | 1.50506E−03 |
| A12 = | 1.72894E−01 | 1.84142E−02 | −1.67160E−01 | −1.75127E−02 | −2.01747E−04 | −2.02279E−04 |
| A14 = | | | 3.21504E−02 | 1.42687E−03 | 2.49989E−05 | 1.16965E−05 |

The equation of the aspheric surface profiles of the seventh embodiment has the same form as that of the first embodiment. Moreover, the definitions of the parameters of the relations are the same as those set forth in the first embodiment, but the value of the relations of the seventh embodiment are listed in the following table 20:

TABLE 20

(Embodiment 7)

| f | 4.62 | R10/CT5 | −1.34 |
|---|---|---|---|
| Fno | 2.80 | \|f/f3\| + \|f/f4\| | 0.20 |
| HFOV | 31.0 | \|f/f5\| + \|f/f6\| | 3.79 |
| V1 − V2 | 32.9 | (\|f5\| + \|f6\|)/(\|f3\| + \|f4\|) | 0.04 |
| V1 − (V2 + V3)/2 | 16.5 | (CT2 + CT3 + CT4)/f | 0.19 |
| \|R1/R2\| | 0.23 | SL/TTL | 0.97 |
| \|R10/R11\| | 0.23 | TTL/ImgH | 1.90 |

Embodiment 8

Figure 8A:
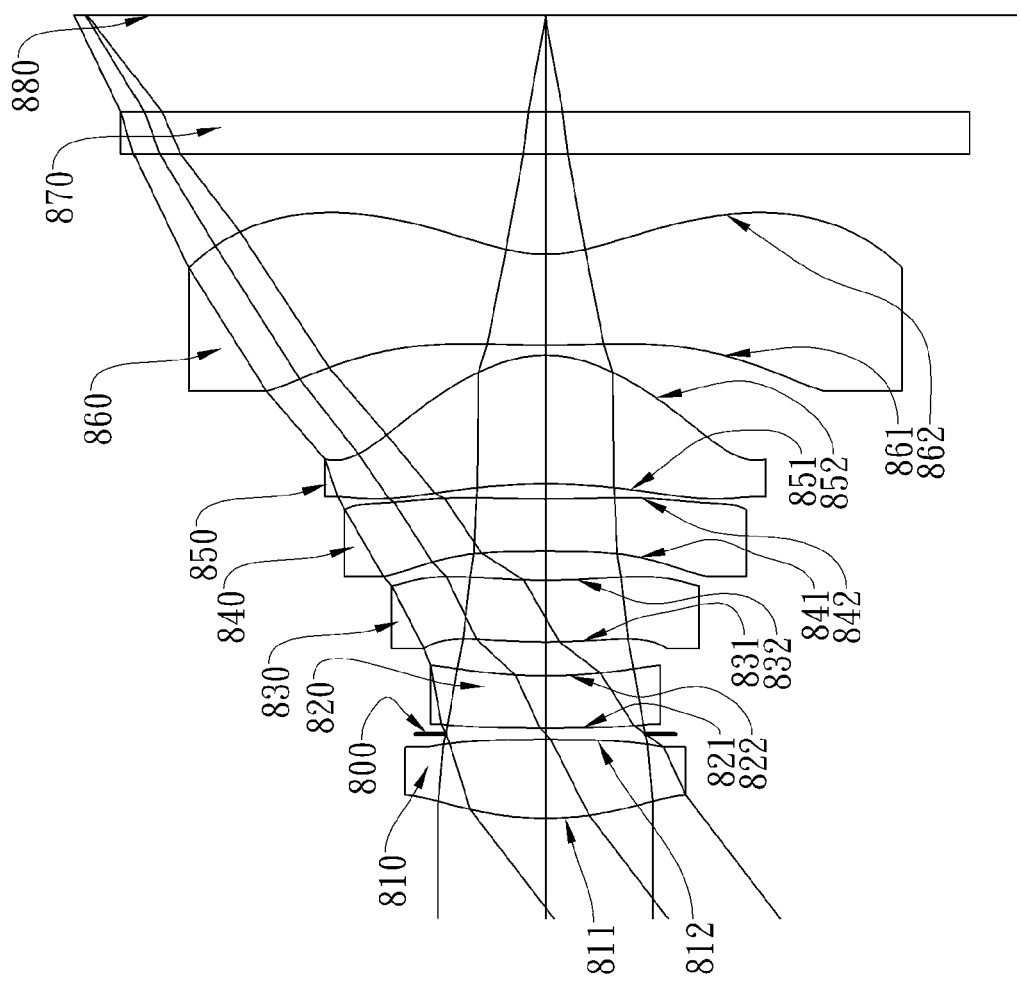
FIG. 8A shows an image capturing lens assembly in accordance with a eighth embodiment of the present invention.
Figure 8B:
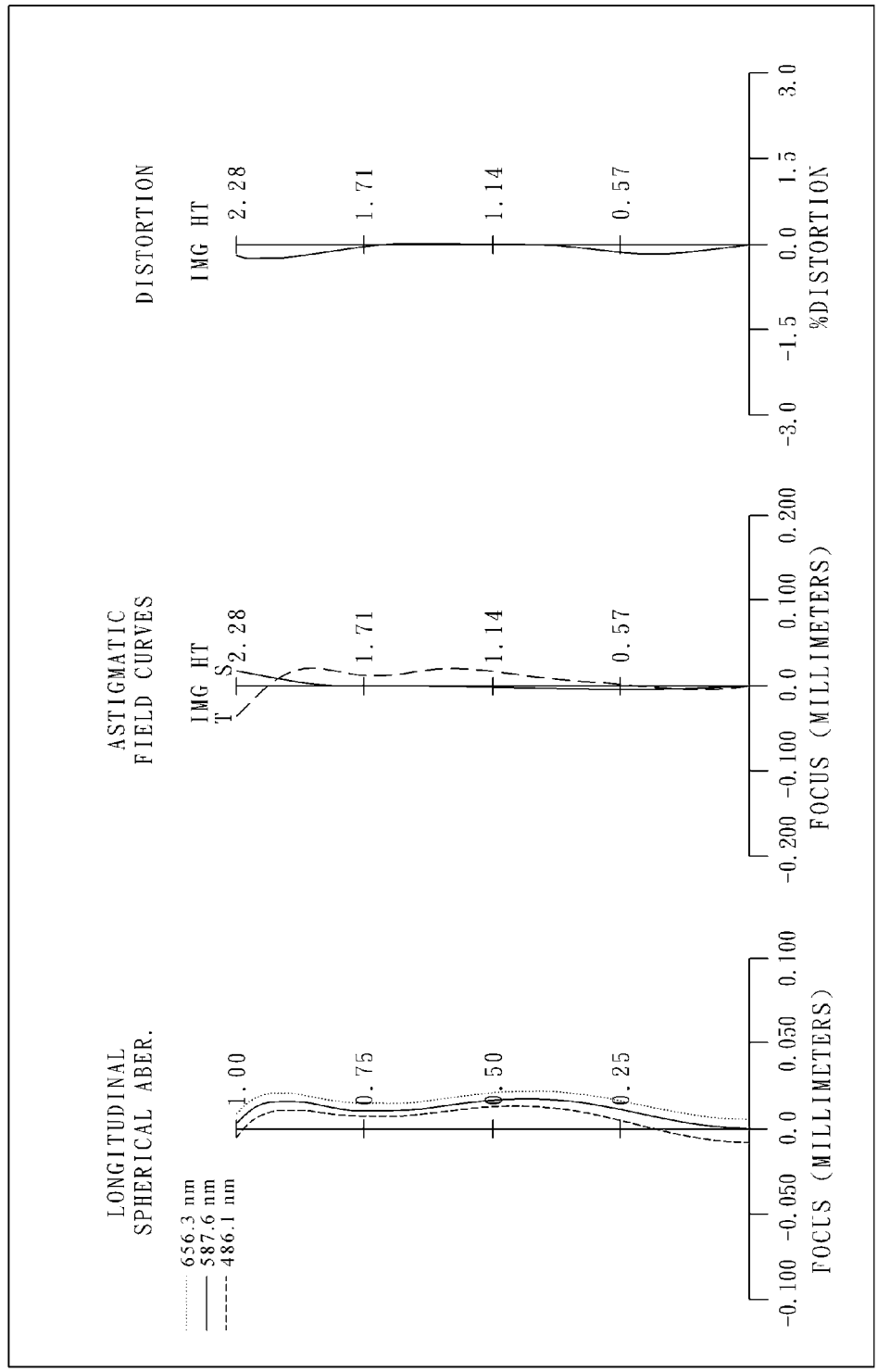
FIG. 8B shows the aberration curves of the eighth embodiment of the present invention.

FIG. 8A shows an image capturing lens assembly in accordance with the eighth embodiment of the present invention, and FIG. 8B shows the aberration curves of the eighth embodiment of the present invention. The image capturing lens assembly of the eighth embodiment of the present invention mainly comprises six lens elements, in order from an object side to an image side:

a plastic first lens element 810 with positive refractive power having a convex object-side surface 811 and a convex image-side surface 812, the object-side and image-side surfaces 811 and 812 thereof being aspheric;

a plastic second lens element 820 with negative refractive power having a convex object-side surface 821 and a concave image-side surface 822, the object-side and image-side surfaces 821 and 822 thereof being aspheric;

a plastic third lens element 830 with positive refractive power having a convex object-side surface 831 and a concave image-side surface 832, the object-side and image-side surfaces 831 and 832 thereof being aspheric;

a plastic fourth lens element 840 with negative refractive power having a concave object-side surface 841 and a concave image-side surface 842, the object-side and image-side surfaces 841 and 842 thereof being aspheric;

a plastic fifth lens element 850 with positive refractive power having a concave object-side surface 851 and a convex image-side surface 852, the object-side and image-side surfaces 851 and 852 thereof being aspheric, and at least one inflection point is formed on both the object-side surface 851 and the image-side surface 852 thereof; and a plastic sixth lens element 860 with negative refractive power having a convex object-side surface 861 and a concave image-side surface 862, the object-side and image-side surfaces 861 and 862 thereof being aspheric, and at least one inflection point is formed on both the object-side surface 861 and the image-side surface 862 thereof;

wherein an aperture stop 800 is disposed between the first lens element 810 and the second lens element 820;

the image capturing lens assembly further comprises an IR filter 870 disposed between the image-side surface 862 of the sixth lens element 860 and an image plane 880, and the IR filter 870 is made of glass and has no influence on the focal length of the image capturing lens assembly; the image capturing lens assembly further comprises an image sensor provided on the image plane 880.

The detailed optical data of the eighth embodiment is shown in TABLE 21, and the aspheric surface data is shown in TABLE 22, wherein the units of the radius of curvature, the thickness and the focal length are expressed in mm, and HFOV is half of the maximal field of view.

TABLE 21

(Embodiment 8)
f = 2.98 mm, Fno = 2.80, HFOV = 37.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.504700 (ASP) | 0.391 | Plastic | 1.530 | 55.8 | 2.65 |
| 2 | | −19.429014 (ASP) | 0.028 | | | | |
| 3 | Ape. Stop | Plano | 0.028 | | | | |
| 4 | Lens 2 | 6.753888 (ASP) | 0.260 | Plastic | 1.632 | 23.4 | −5.61 |
| 5 | | 2.289442 (ASP) | 0.169 | | | | |
| 6 | Lens 3 | 2.814621 (ASP) | 0.306 | Plastic | 1.632 | 23.4 | 34.75 |
| 7 | | 3.092100 (ASP) | 0.144 | | | | |

TABLE 21-continued (Embodiment 8)
f = 2.98 mm, Fno = 2.80, HFOV = 37.4 deg.

| Surface # | | Curvature Radius | Thickness | Material | Index | Abbe # | Focal length |
|---|---|---|---|---|---|---|---|
| 8 | Lens 4 | −15.082925 (ASP) | 0.260 | Plastic | 1.634 | 23.8 | −6.37 |
| 9 | | 5.558032 (ASP) | 0.075 | | | | |
| 10 | Lens 5 | −3.041968 (ASP) | 0.641 | Plastic | 1.530 | 55.8 | 1.27 |
| 11 | | −0.590767 (ASP) | 0.051 | | | | |
| 12 | Lens 6 | 6.666667 (ASP) | 0.450 | Plastic | 1.544 | 55.9 | −1.44 |
| 13 | | 0.684798 (ASP) | 0.500 | | | | |
| 14 | IR-filter | Plano | 0.210 | Glass | 1.517 | 64.2 | — |
| 15 | | Plano | 0.480 | | | | |
| 16 | Image | Plano | — | | | | |

Note:
Reference Wavelength is 587.6 nm (d-line)

TABLE 22

Aspheric Coefficients

| Surface # | 1 | 2 | 4 | 5 | 6 | 7 |
|---|---|---|---|---|---|---|
| k = | −1.25748E+01 | 0.00000E+00 | 0.00000E+00 | −3.49889E+01 | −5.73913E+01 | −1.12299E+01 |
| A4 = | 3.46300E−01 | −3.82174E−01 | −2.94827E−01 | 6.18229E−02 | −2.10456E−01 | −2.86225E−01 |
| A6 = | −9.14399E−01 | 1.01579E+00 | 1.91318E+00 | 9.29861E−02 | −5.57438E−01 | −6.25401E−02 |
| A8 = | 7.91985E−01 | −2.29154E+00 | −3.31550E+00 | 1.48340E−01 | −3.45765E−01 | 2.55897E−01 |
| A10 = | −3.66895E−01 | 1.87988E+00 | −9.69656E−01 | −2.65811E+00 | −9.35451E−01 | −2.47447E+00 |
| A12 = | −1.21704E+00 | −1.34071E+00 | 1.32826E+01 | 9.49359E−01 | −4.99355E+00 | 3.35996E+00 |
| A14 = | 1.14894E+00 | 2.13374E+00 | −9.63036E+00 | | | 2.18710E−01 |

| Surface # | 8 | 9 | 10 | 11 | 12 | 13 |
|---|---|---|---|---|---|---|
| k = | 0.00000E+00 | 0.00000E+00 | −9.90000E+01 | −3.30530E+00 | 0.00000E+00 | −6.42494E+00 |
| A4 = | −5.43903E−01 | −4.13614E−01 | −3.20941E−01 | −3.84285E−01 | −2.65504E−01 | −1.98873E−01 |
| A6 = | 5.01595E−01 | 5.99205E−01 | 8.93865E−01 | 4.30413E−01 | 1.09656E−01 | 1.34427E−01 |
| A8 = | −1.24179E+00 | −8.91900E−01 | −1.28159E+00 | −4.28367E−01 | 2.93056E−02 | −6.96573E−02 |
| A10 = | 3.47946E+00 | 1.20125E+00 | 1.22158E+00 | 5.03876E−01 | −5.56308E−02 | 2.26517E−02 |
| A12 = | −2.55661E+00 | −6.38884E−01 | −5.76235E−01 | −1.88479E−01 | 2.43530E−02 | −4.30663E−03 |
| A14 = | | | 7.26787E−02 | | −3.53819E−03 | 3.56250E−04 |

The equation of the aspheric surface profiles of the eighth embodiment has the same form as that of the first embodiment. Moreover, the definitions of the parameters of the relations are the same as those set forth in the first embodiment, but the value of the relations of the eighth embodiment are listed in the following table 23:

TABLE 23

(Embodiment 8)

| f | 2.98 | R10/CT5 | −0.92 |
|---|---|---|---|
| Fno | 2.80 | |f/f3| + |f/f4| | 0.55 |
| HFOV | 37.4 | |f/f5| + |f/f6| | 4.41 |
| V1 − V2 | 32.4 | (|f5| + |f6|)/(|f3| + |f4|) | 0.07 |
| V1 − (V2 + V3)/2 | 32.4 | (CT2 + CT3 + CT4)/f | 0.28 |
| |R1/R2| | 0.08 | SL/TTL | 0.89 |
| |R10/R11| | 0.09 | TTL/ImgH | 1.72 |

Embodiment 9

Figure 9A:
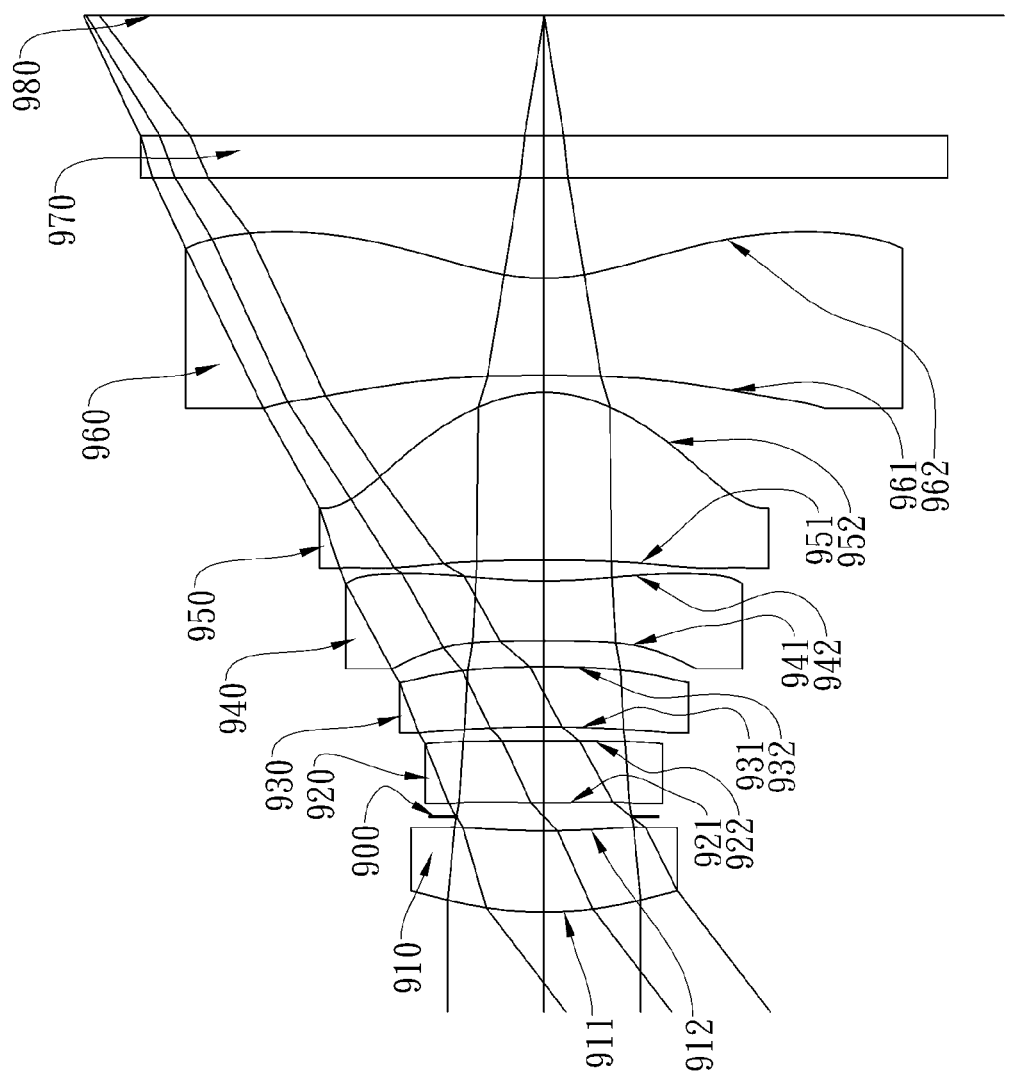
FIG. 9A shows an image capturing lens assembly in accordance with a ninth embodiment of the present invention.
Figure 9B:
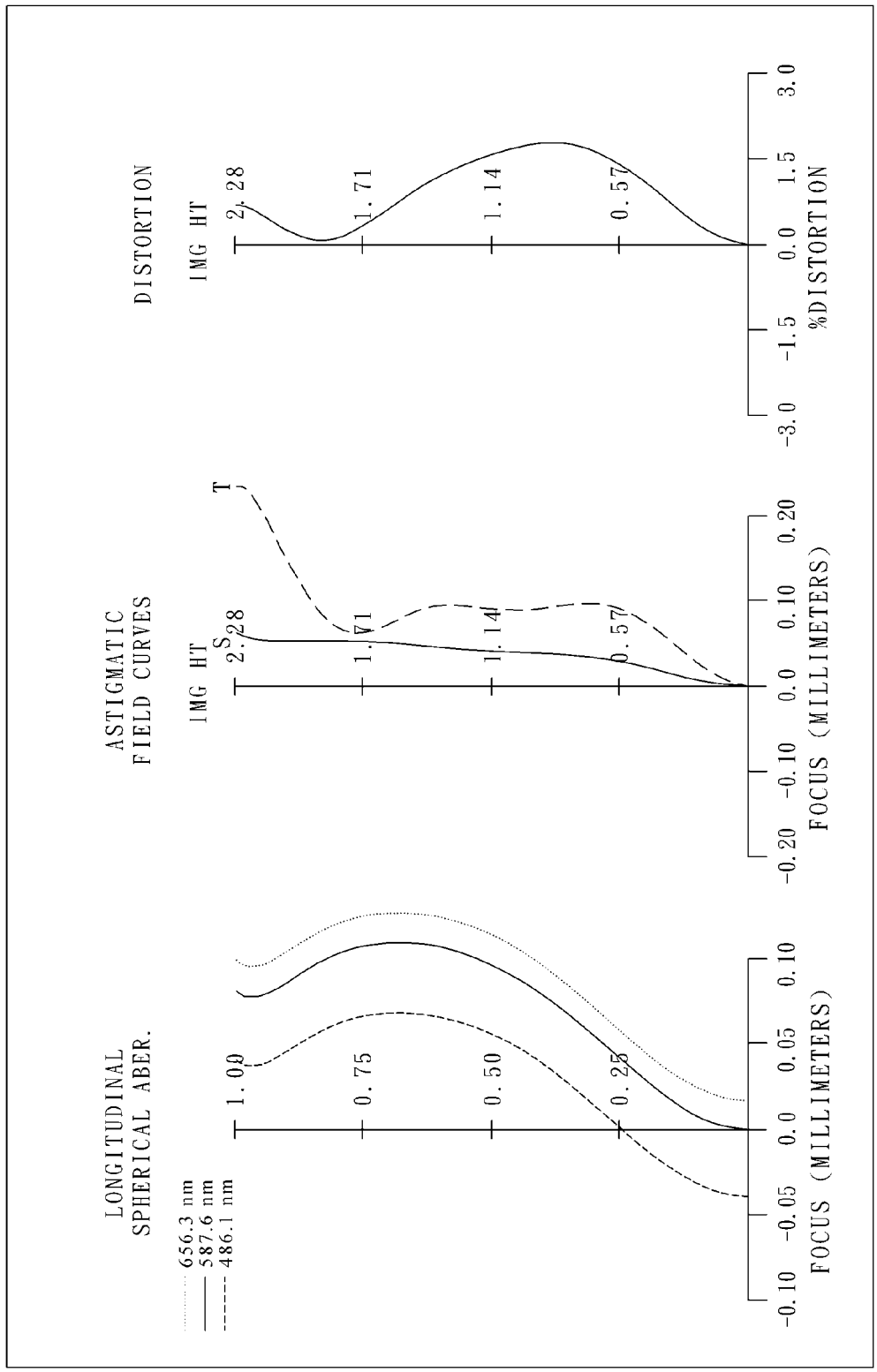
FIG. 9B shows the aberration curves of the ninth embodiment of the present invention.

FIG. 9A shows an image capturing lens assembly in accordance with the seventh embodiment of the present invention, and FIG. 9B shows the aberration curves of the seventh embodiment of the present invention. The image capturing lens assembly of the seventh embodiment of the present invention mainly comprises six lens elements, in order from an object side to an image side:

a plastic first lens element 910 with positive refractive power having a convex object-side surface 911 and a concave image-side surface 912, the object-side and image-side surfaces 911 and 912 thereof being aspheric;

a plastic second lens element 920 with positive refractive power having a convex object-side surface 921 and a convex image-side surface 922, the object-side and image-side surfaces 921 and 922 thereof being aspheric;

a plastic third lens element 930 with negative refractive power having a concave object-side surface 931 and a convex image-side surface 932, the object-side and image-side surfaces 931 and 932 thereof being aspheric;

a plastic fourth lens element 940 with negative refractive power having a convex object-side surface 941 and a concave image-side surface 942, the object-side and image-side surfaces 941 and 942 thereof being aspheric;

a plastic fifth lens element 950 with positive refractive power having a concave object-side surface 951 and a convex image-side surface 952, the object-side and image-side surfaces 951 and 952 thereof being aspheric, and at least one inflection point is formed on both the object-side surface 951 and the image-side surface 952 thereof; and a plastic sixth lens element 960 with negative refractive power having a concave object-side surface 961 and a concave image-side surface 962, the object-side and image-side surfaces 961 and 962 thereof being aspheric, and at least one inflection point is formed on the image-side surface 962 thereof;

wherein an aperture stop 900 is disposed between the first lens element 910 and the second lens element 920;

the image capturing lens assembly further comprises an IR filter 970 disposed between the image-side surface 962 of the sixth lens element 960 and an image plane 980, and the IR filter 970 is made of glass and has no influence on the focal length of the image capturing lens assembly; the image capturing lens assembly further comprises an image sensor provided on the image plane 980.

The detailed optical data of the ninth embodiment is shown in TABLE 24, and the aspheric surface data is shown in TABLE 25, wherein the units of the radius of curvature, the thickness and the focal length are expressed in mm, and HFOV is half of the maximal field of view.

TABLE 24

(Embodiment 9)
$f = 2.89$ mm, Fno = 3.00, HFOV = 37.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.882184 (ASP) | 0.405 | Glass | 1.717 | 29.5 | 4.89 |
| 2 | | 3.699685 (ASP) | 0.070 | | | | |
| 3 | Ape. Stop | Plano | 0.070 | | | | |
| 4 | Lens 2 | 7.570551 (ASP) | 0.309 | Plastic | 1.634 | 23.8 | 10.98 |
| 5 | | −85.055376 (ASP) | 0.070 | | | | |
| 6 | Lens 3 | −5.879618 (ASP) | 0.300 | Plastic | 1.634 | 23.8 | −96.63 |
| 7 | | −6.632585 (ASP) | 0.129 | | | | |
| 8 | Lens 4 | 877.081641 (ASP) | 0.300 | Plastic | 1.634 | 23.8 | −4.08 |
| 9 | | 2.578981 (ASP) | 0.102 | | | | |
| 10 | Lens 5 | −130.151675 (ASP) | 0.839 | Plastic | 1.544 | 55.9 | 1.31 |
| 11 | | −0.710147 (ASP) | 0.084 | | | | |
| 12 | Lens 6 | −14.477401 (ASP) | 0.487 | Plastic | 1.544 | 55.9 | −1.75 |
| 13 | | 1.034457 (ASP) | 0.500 | | | | |
| 14 | IR-filter | Plano | 0.210 | Glass | 1.517 | 64.2 | — |
| 15 | | Plano | 0.601 | | | | |
| 16 | Image | Plano | — | | | | |

Note:
Reference Wavelength is 587.6 nm (d-line)

TABLE 25

Aspheric Coefficients

| Surface # | 1 | 2 | 4 | 5 | 6 | 7 |
|---|---|---|---|---|---|---|
| k = | −2.85626E+01 | 0.00000E+00 | 0.00000E+00 | −1.00000E+00 | 3.22255E+01 | 6.05506E+01 |
| A4 = | 4.25894E−01 | −2.31025E−01 | −3.98805E−01 | −5.58772E−02 | 2.61798E−02 | −2.48453E−01 |
| A6 = | −8.69724E−01 | 5.54370E−01 | 1.04030E+00 | −1.33552E−01 | 1.71206E−01 | 3.53025E−01 |
| A8 = | 6.61630E−01 | −3.24564E+00 | −6.25049E+00 | 3.52987E−01 | −1.68401E−01 | 5.71617E−02 |
| A10 = | 1.04078E+00 | −4.51774E+00 | 2.35926E+00 | −5.14021E−01 | −3.48310E−01 | −2.00003E+00 |
| A12 = | −4.53743E+00 | 3.36899E+00 | 3.23436E+00 | −1.08249E+00 | 9.09138E−02 | 3.48143E+00 |
| A14 = | 3.94216E+00 | 7.29494E+01 | 5.69028E+01 | | | −5.03291E−01 |

| Surface # | 8 | 9 | 10 | 11 | 12 | 13 |
|---|---|---|---|---|---|---|
| k = | 0.00000E+00 | 0.00000E+00 | −9.90000E+01 | −2.82390E+00 | 0.00000E+00 | −5.03723E+00 |
| A4 = | −5.75379E−01 | −3.79103E−01 | −3.90160E−01 | −3.71327E−01 | −1.30310E−01 | −1.72501E−01 |
| A6 = | 3.54070E−01 | 4.94666E−01 | 9.37137E−01 | 3.82555E−01 | 9.28004E−02 | 1.27137E−01 |
| A8 = | −1.41541E+00 | −9.24690E−01 | −1.28519E+00 | −4.49545E−01 | 1.98262E−02 | −6.88102E−02 |
| A10 = | 3.48215E+00 | 1.20427E+00 | 1.21549E+00 | 5.17929E−01 | −5.81541E−02 | 2.26900E−02 |
| A12 = | −2.20917E+00 | −6.20328E−01 | −5.51882E−01 | −1.84103E−01 | 3.02441E−02 | −3.88805E−03 |
| A14 = | | | 4.27436E−02 | | −5.56279E−03 | 2.48485E−04 |

The equation of the aspheric surface profiles of the ninth embodiment has the same form as that of the first embodiment. Moreover, the definitions of the parameters of the relations are the same as those set forth in the first embodiment, but the value of the relations of the ninth embodiment are listed in the following table 26:

TABLE 26

(Embodiment 9)

| f | 2.89 | R10/CT5 | −0.85 |
|---|---|---|---|
| Fno | 3.00 | |f/f3| + |f/f4| | 0.74 |
| HFOV | 37.4 | |f/f5| + |f/f6| | 3.86 |
| V1 − V2 | 5.7 | (|f5| + |f6|)/(|f3| + |f4|) | 0.03 |
| V1 −(V2 + V3)/2 | 5.7 | (CT2 + CT3 + CT4)/f | 0.32 |
| |R1/R2| | 0.51 | SL/TTL | 0.89 |
| |R10/R11| | 0.05 | TTL/ImgH | 1.93 |

It is to be noted that TABLES 1-26 show different data of the different embodiments, however, the data of the different embodiments are obtained from experiments. Therefore, any image capturing lens assembly of the same structure is considered to be within the scope of the present invention even if it uses different data. The embodiments depicted above and the appended drawings are exemplary and are not intended to limit the scope of the present invention.

What is claimed is:

1. An image capturing lens assembly comprising, in order from an object side to an image side:
   a first lens element with positive refractive power having a convex object-side surface;
   a second lens element;
   a third lens element;
   a fourth lens element having at least one of an object-side surface and an image-side surface thereof being aspheric;
   a fifth lens element with positive refractive power having a convex image-side surface, at least one of an object-side surface and the image-side surface thereof being aspheric, and the fifth lens element is made of plastic; and
   a sixth lens element with negative refractive power having a concave image-side surface, at least one of an object-side surface and the image-side surface thereof being aspheric, and the sixth lens element is made of plastic;
   wherein a radius of curvature of the image-side surface of the fifth lens element is R10, a radius of curvature of the object-side surface of the sixth lens element is R11, the image capturing lens assembly further comprises an image sensor on an image plane; a distance on the optical axis between the object-side surface of the first lens element and the image plane is TTL, half of a diagonal length of an effective photosensitive area of the image sensor is ImgH, and they satisfy the following relations:

$|R10/R11|<0.75$; and $TTL/ImgH<3.0$.

2. The image capturing lens assembly according to claim 1, wherein a focal length of the image capturing lens assembly is f, a focal length of the third lens element is f3, a focal length of the fourth lens element is f4, and they satisfy the following relation:

$|f/f3|+|f/f4|<1.3$.

3. The image capturing lens assembly according to claim 2, wherein at least one inflection point is formed on at least one of the object-side and the image-side surfaces of the fifth lens element.

4. The image capturing lens assembly according to claim 3, wherein the second lens element has negative refractive power.

5. The image capturing lens assembly according to claim 4, wherein the image capturing lens assembly also comprises an aperture stop, a distance on an optical axis between the aperture stop and the image plane is SL, a distance on the optical axis between the object-side surface of the first lens element and the image plane is TTL, and they satisfy the following relation:

$0.7<SL/TTL<1.1$.

6. The image capturing lens assembly according to claim 5, wherein a radius of curvature of the object-side surface of the first lens element is R1, a radius of curvature of the image-side surface of the first lens element is R2, and they satisfy the following relation:

$|R1/R2|<0.3$.

7. The image capturing lens assembly according to claim 5, wherein the radius of curvature of the image-side surface of the fifth lens element is R10, a thickness of the fifth lens element on the optical axis is CT5, and they satisfy the following relation:

$-1.5<R10/CT5<-0.5$.

8. The image capturing lens assembly according to claim 4, wherein an Abbe number of the first lens element is V1, an Abbe number of the second lens element is V2, and they satisfy the following relation:

$28<V1-V2<45$.

9. The image capturing lens assembly according to claim 8, wherein a focal length of the fifth lens element is f5, a focal length of the sixth lens element is f6, a focal length of the third lens element is f3, a focal length of the fourth lens element is f4, and they satisfy the following relation:

$(|f5|+|f6|)/(|f3|+|f4|)<0.3$.

10. The image capturing lens assembly according to claim 3, wherein an Abbe number of the first lens element is V1, an Abbe number of the second lens element is V2, an Abbe number of the third lens element is V3, and they satisfy the following relation:

$23<V1-(V2+V3)/2<45$.

11. The image capturing lens assembly according to claim 4, wherein a focal length of the image capturing lens assembly is f, a focal length of the fifth lens element is f5, a focal length of the sixth lens element is f6, and they satisfy the following relation:

$3.0<|f/f5|+|f/f6|<6.0$.

12. The image capturing lens assembly according to claim 4, wherein the focal length of the image capturing lens assembly is f, the focal length of the third lens element is f3, the focal length of the fourth lens element is f4, and they satisfy the following relation:

$|f/f3|+|f/f4|<0.9$.

13. The image capturing lens assembly according to claim 4, wherein the radius of curvature of the image-side surface of the fifth lens element is R10, the radius of curvature of the object-side surface of the sixth lens element is R11, and they satisfy the following relation:

$|R10/R11|<0.40$.

14. The image capturing lens assembly according to claim 3, wherein a thickness of the second lens element on the optical axis is CT2, a thickness of the third lens element on the optical axis is CT3, a thickness of the fourth lens element on the optical axis is CT4, the focal length of the image capturing lens assembly is f, and they satisfy the following relation:

$0.10<(CT2+CT3+CT4)/f<0.35$.

15. The image capturing lens assembly according to claim 3, wherein a thickness of the second lens element on the optical axis is CT2, a thickness of the third lens element on the optical axis is CT3, a thickness of the fourth lens element on the optical axis is CT4, the focal length of the image capturing lens assembly is f, and they satisfy the following relation:

$0.10<(CT2+CT3+CT4)/f<0.28$.

16. An image capturing lens assembly comprising, in order from an object side to an image side:
    a first lens element with positive refractive power having a convex object-side surface;
    a second lens element with negative refractive power;
    a third lens element;
    a fourth lens element having at least one of an object-side surface and an image-side surface thereof being aspheric;

a fifth lens element with positive refractive power having a convex image-side surface, and at least one of an object-side surface and the image-side surface thereof being aspheric; and a sixth lens element with negative refractive power having a concave image-side surface, and at least one inflection point is formed on at least one of an object-side surface and the image-side surface thereof;

wherein a focal length of the fifth lens element is f5, a focal length of the sixth lens element is f6, a focal length of the third lens element is f3, a focal length of the fourth lens element is f4, and they satisfy the following relation:

$(|f5|+|f6|)/(|f3|+|f4|)<0.4.$

17. The image capturing lens assembly according to claim 16, wherein the image capturing lens assembly also comprises an aperture stop, a distance on an optical axis between the aperture stop and an image plane is SL, a distance on the optical axis between the object-side surface of the first lens element and the image plane is TTL, and they satisfy the following relation:

$0.7<SL/TTL<1.1.$

18. The image capturing lens assembly according to claim 17, wherein a thickness of the second lens element on the optical axis is CT2, a thickness of the third lens element on the optical axis is CT3, a thickness of the fourth lens element on the optical axis is CT4, a focal length of the image capturing lens assembly is f, and they satisfy the following relation:

$0.10<(CT2+CT3+CT4)/f<0.28.$

19. The image capturing lens assembly according to claim 17, wherein the second lens element has a concave image-side surface.

20. The image capturing lens assembly according to claim 19, an Abbe number of the first lens element is V1, an Abbe number of the second lens element is V2, and they satisfy the following relation:

$28<V1-V2<45.$

21. The image capturing lens assembly according to claim 16, wherein an Abbe number of the first lens element is V1, an Abbe number of the second lens element is V2, an Abbe number of the third lens element is V3, and they satisfy the following relation:

$23<V1-(V2+V3)/2<45.$

22. The image capturing lens assembly according to claim 16, wherein the focal length of the fifth lens element is f5, the focal length of the sixth lens element is f6, the focal length of the third lens element is f3, the focal length of the fourth lens element is f4, and they satisfy the following relation:

$(|f5|+|f6|)/(|f3|+|f4|)<0.15.$

23. The image capturing lens assembly according to claim 16, wherein the sixth lens element has a concave object-side surface.

24. The image capturing lens assembly according to claim 16, wherein the image capturing lens assembly further comprises an image sensor on an image plane; a distance on the optical axis between the object-side surface of the first lens element and the image plane is TTL, half of a diagonal length of an effective photosensitive area of the image sensor is ImgH, and they satisfy the following relations:

$TTL/ImgH<2.3.$

* * * * *

UNITED STATES PATENT AND TRADEMARK OFFICE
CERTIFICATE OF CORRECTION

PATENT NO. : 8,310,767 B2  
APPLICATION NO. : 13/084855  
DATED : November 13, 2012  
INVENTOR(S) : Hsin Hsuan Huang et al.

Page 1 of 1

It is certified that error appears in the above-identified patent and that said Letters Patent is hereby corrected as shown below:

On the Title Page (Item 73):

Delete the Assignee name "~~Largen Precision Co., Ltd~~".

Insert the Assignee name -- Largan Precision Co., Ltd. --.

Signed and Sealed this
Twenty-fifth Day of December, 2012

David J. Kappos
*Director of the United States Patent and Trademark Office*